(12) United States Patent
Ono

(10) Patent No.: US 10,312,708 B2
(45) Date of Patent: Jun. 4, 2019

(54) POWER SUPPLY DEVICE, AC ADAPTER, AC CHARGER, ELECTRONIC DEVICE, AND POWER SUPPLY SYSTEM

(71) Applicant: ROHM CO., LTD., Ukyo-Ku, Kyoto (JP)

(72) Inventor: Akihiro Ono, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 270 days.

(21) Appl. No.: 15/333,627

(22) Filed: Oct. 25, 2016

(65) Prior Publication Data

US 2017/0040820 A1 Feb. 9, 2017

Related U.S. Application Data

(63) Continuation of application No. PCT/JP2015/060619, filed on Apr. 3, 2015.

(30) Foreign Application Priority Data

Apr. 25, 2014 (JP) .................................. 2014-091705

(51) Int. Cl.
*H02J 7/00* (2006.01)
*H02M 1/08* (2006.01)
(Continued)

(52) U.S. Cl.
CPC .............. *H02J 7/0052* (2013.01); *H02M 1/08* (2013.01); *H02M 3/33576* (2013.01);
(Continued)

(58) Field of Classification Search
USPC ...................................................... 320/107
See application file for complete search history.

(56) References Cited

U.S. PATENT DOCUMENTS

| 2010/0149837 A1* | 6/2010 | Nishihara | ............... H02M 1/32 363/17 |
| 2013/0155737 A1* | 6/2013 | Jeong | ................ H02M 3/33507 363/78 |

FOREIGN PATENT DOCUMENTS

| CN | 1938931 A1 | 3/2007 |
| CN | 101411048 A | 4/2009 |
| | (Continued) | |

OTHER PUBLICATIONS

JPO Notification of Reasons for Refusal corresponding to Application No. 2014-091705; dated Jun. 5, 2018.
(Continued)

*Primary Examiner* — Robert Grant
(74) *Attorney, Agent, or Firm* — Cantor Colburn LLP

(57) ABSTRACT

The PD device includes: a DC/DC converter disposed between an input and an output; a primary-side controller configured to control an input current of the DC/DC converter; and a secondary-side controller coupled to a control input, the secondary-side controller configured to receive a control input signal of the control input, and then feedback the received control input signal to the primary-side controller. The primary-side controller varies an output voltage value and an available output current capacity (MAX value) of the DC/DC converter by controlling the input current on the basis of the control input signal fed back from the secondary-side controller. There are provide the PD device, the AC adapter, the AC charger, the electronic apparatus, and the PD system, each capable of achieving miniaturization and cost reduction, and capable of controlling the output voltage value and the available output current capacity (MAX value).

20 Claims, 29 Drawing Sheets

(51) Int. Cl.
  *H02M 3/335* (2006.01)
  *H02M 1/00* (2006.01)
(52) U.S. Cl.
  CPC . *H02M 3/33592* (2013.01); *H02J 2007/0059* (2013.01); *H02M 2001/0009* (2013.01); *Y02B 40/90* (2013.01)

(56) References Cited

FOREIGN PATENT DOCUMENTS

| CN | 103166487 A | 6/2013 |
| JP | S5731015 A | 2/1982 |
| JP | 2003169476 A | 6/2003 |
| JP | 2004506368 A | 2/2004 |
| JP | 2004274885 A | 9/2004 |
| JP | 2007020388 A | 1/2007 |
| JP | 2007159201 A | 6/2007 |
| JP | 2009118563 A | 5/2009 |
| JP | 2010088274 A | 4/2010 |
| JP | 2010284073 A | 12/2010 |
| JP | 2011082802 A | 4/2011 |
| JP | 2011083049 A | 4/2011 |
| JP | 2012034491 A | 2/2012 |
| JP | 2012100451 A | 5/2012 |
| JP | 2012161185 A | 8/2012 |
| JP | 2012257153 A | 12/2012 |
| JP | 2013034354 A | 2/2013 |
| JP | 2013059234 A | 3/2013 |
| JP | 2013081333 A | 5/2013 |
| JP | 2013516956 A | 5/2013 |
| JP | 2013126373 A | 6/2013 |
| JP | 2013188093 A | 9/2013 |
| JP | 2013192441 A | 9/2013 |
| JP | 2014039383 A | 2/2014 |
| JP | 2014068461 A | 4/2014 |
| JP | 2004153983 A | 5/2014 |
| WO | 2008146463 A1 | 12/2008 |

OTHER PUBLICATIONS

SIPO First Office Action corresponding to Application No. 201580020998.4; dated Jun. 5, 2018.
International Search Report corresponding to Application No. PCT/JP2015/060619; dated Jun. 30, 2015, with English translation.
Edited by Bob Dunstan, "Universal Serial Bus Power Delivery Specification Revision 1.0", released on Jul. 5, 2012, pp. 1-328, http://www.usb.org/developers/docs/.
"The details of a reversible USB Type-C connector standard are public presentation," Apr. 3, 2014, PC-Watch. <https://pc.watch.impress.co.jp/docs/news/642743>; 3 pages.
"Wikipedia Lightning (interface)," Wikipedia, 2018; https://ja.wikipedia.org/wiki/Lightning; 6 pages.
"Wikipedia USBType-C," Aug. 16, 2018, https://ja.wikipedia.org; 24 pages.
JPO Decision of Refusal corresponding to Application No. JP2014-091705; dated Feb. 5, 2019.
Kaizuka Kei; "Next generation USB standard "USB Type-C" is reversibly," Dec. 6, 2013, ASCII, <URL:http://ascii.jp/elem/000/000/848/848846.>; 2 pages.

\* cited by examiner

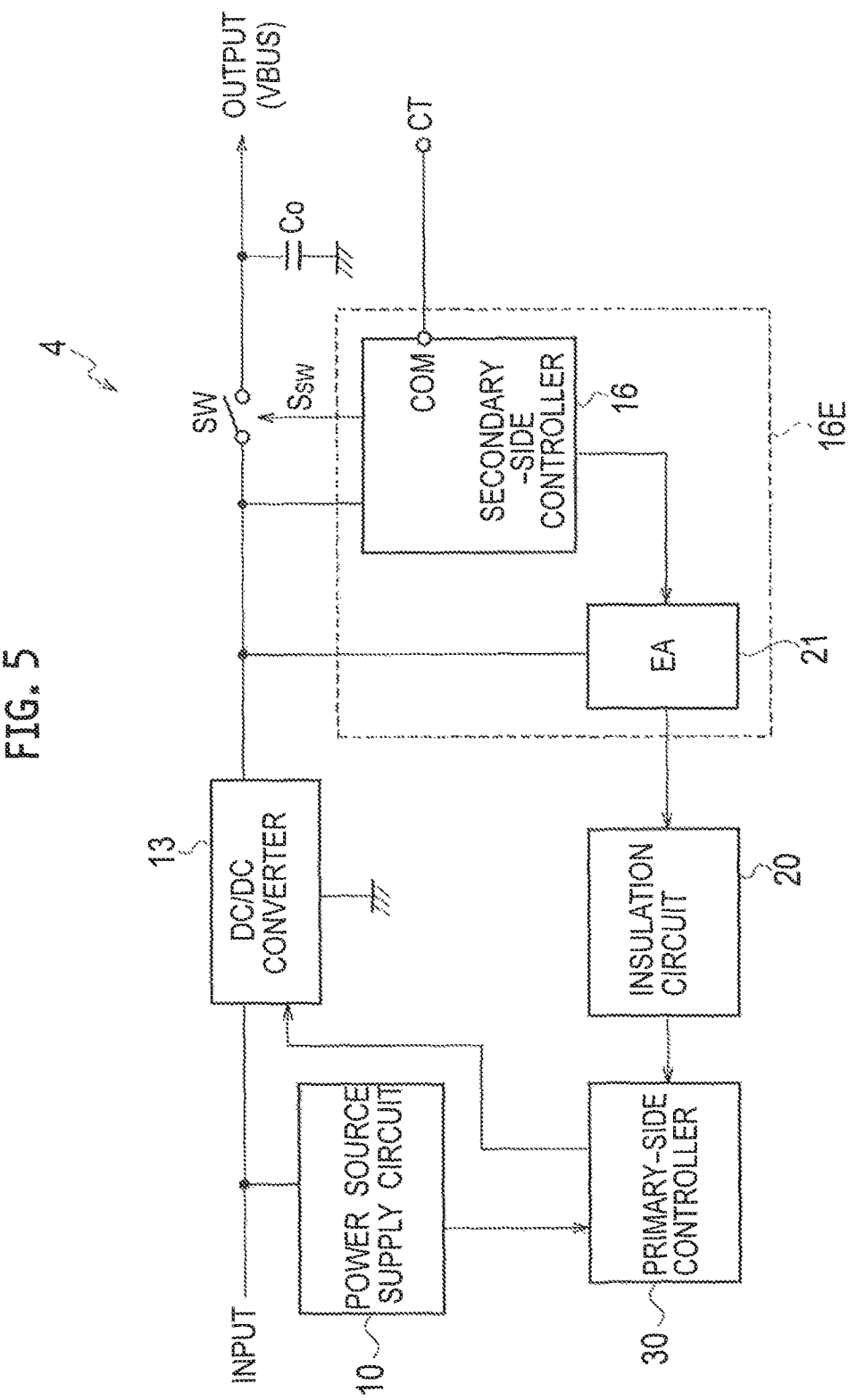

POWER SUPPLY DEVICE, AC ADAPTER, AC CHARGER, ELECTRONIC DEVICE, AND POWER SUPPLY SYSTEM

CROSS REFERENCE TO RELATED APPLICATIONS

This is a continuation application (CA) of PCT Application No. PCT/JP2015/060619, filed on Apr. 3, 2015, which claims priority to Japan Patent Application No. P2014-091705 filed on Apr. 25, 2014 and is based upon and claims the benefit of priority from prior Japanese Patent Applications No. P2014-091705 filed on Apr. 25, 2014 and PCT Application No. PCT/JP2015/060619, filed on Apr. 3, 2015, the entire contents of each of which are incorporated herein by reference.

FIELD

The embodiments described herein relate a Power Delivery device (PD device), an Alternating Current (AC) adapter, an AC charger, an electronic apparatus, and a Power Delivery system (PD system). In particular, the embodiments relate to a PD device, an AC adapter, an AC charger, an electronic apparatus, and a PD system, each which can achieve miniaturization and cost reduction and each which has a variable function of an output voltage value and an available output current capacity (MAX value).

BACKGROUND

Conventionally, there have been provided Direct Current (DC) outlets which can intercommunicate between terminal devices and power line carrier communication networks supporting telecommunications standards with the PD.

There are Power over Ethernet (PoE) technology and Universal Serial Bus (USB) technology as a Power Delivery technology (PD technology) using data lines.

As the USB technologies, there are USB 2.0 Standard up to maximum supply power of 2.5 W, USB 3.1 Standard up to maximum supply power of 4.5 W, and Battery Charging (BC) Revision 1.2 up to maximum supply power of 7.5 W according to the Power Delivery level (PD level).

Moreover, a USB Power Delivery (USB PD) Specification is compatible with existing cables and existing connectors, and coexists also with the USB 2.0 Standard, the USB 3.1 Standard, and the USB-BC Revision 1.2. In such a specification, values of the charging current and voltage is selectable within a range of voltage 5V-12V-20V and a range of current 1.5 A-2 A-3 A-5 A, and the USB electric charging and power transmission can be achieved to be 10 W, 18 W, 36 W, 65 W, and the maximum of 100 W.

DC/DC converters have been used as a power source for achieving such a Power Delivery (PD). There are a diode rectification system and a synchronous rectification method in the DC/DC converters.

SUMMARY

The embodiments provide a PD device, an AC adapter, an AC charger, an electronic apparatus, and a PD system, each in which no filter coil is required for an output side, and mounting space is reduced, and thereby capable of achieving miniaturization and cost reduction, and capable of controlling an output voltage value and an available output current capacity (MAX value).

According to one aspect of the embodiments, there is provided a power delivery device comprising: a DC/DC converter disposed between an input and an output; a primary-side controller configured to control an input current of the DC/DC converter; and a secondary-side controller coupled to a control input, the secondary-side controller configured to receive a control input signal of the control input, and then feedback the received control input signal to the primary-side controller, wherein the primary-side controller varies an output voltage value and an available output current capacity of the DC/DC converter by controlling the input current on the basis of the control input signal fed back from the secondary-side controller.

According to another aspect of the embodiments, there is provided a power delivery device comprising: a DC/DC converter disposed between an input and an output; a primary-side controller configured to control an input current of the DC/DC converter; and an insulation circuit connected to a control input, the insulation circuit configured to feedback a control input signal of the control input to the primary-side controller, wherein the primary-side controller varies an output voltage value and an available output current capacity of the DC/DC converter by controlling the input current on the basis of the control input signal fed back from the insulation circuit.

According to still another aspect of the embodiments, there is provided an AC adapter comprising the power delivery device mentioned above.

According to yet another aspect of the embodiments, there is provided an AC charger comprising the power delivery device mentioned above.

According to further aspect of the embodiments, there is provided an electronic apparatus comprising the power delivery device mentioned above.

According to still further aspect of the embodiments, there is provided a power delivery system comprising a power delivery device, the power delivery device comprising: a DC/DC converter disposed between an input and an output; a primary-side controller configured to control an input current of the DC/DC converter; and a secondary-side controller coupled to a control input, the secondary-side controller configured to receive a control input signal of the control input, and then feedback the received control input signal to the primary-side controller, wherein the primary-side controller varies an output voltage value and an available output current capacity of the DC/DC converter by controlling the input current on the basis of the control input signal fed back from the secondary-side controller.

According to the embodiments, there can be provided the PD device, the AC adapter, the AC charger, the electronic apparatus, and the PD system, each in which no filter coil is required for an output side and the mounting space is reduced, and thereby capable of achieving miniaturization and cost reduction, and capable of controlling the output voltage value and the available output current capacity (MAX value).

BRIEF DESCRIPTION OF DRAWINGS

FIG. 5 is a schematic circuit block configuration diagram showing a PD device according to a modified example 1 of the first embodiment.

DESCRIPTION OF EMBODIMENTS

Figure 1:
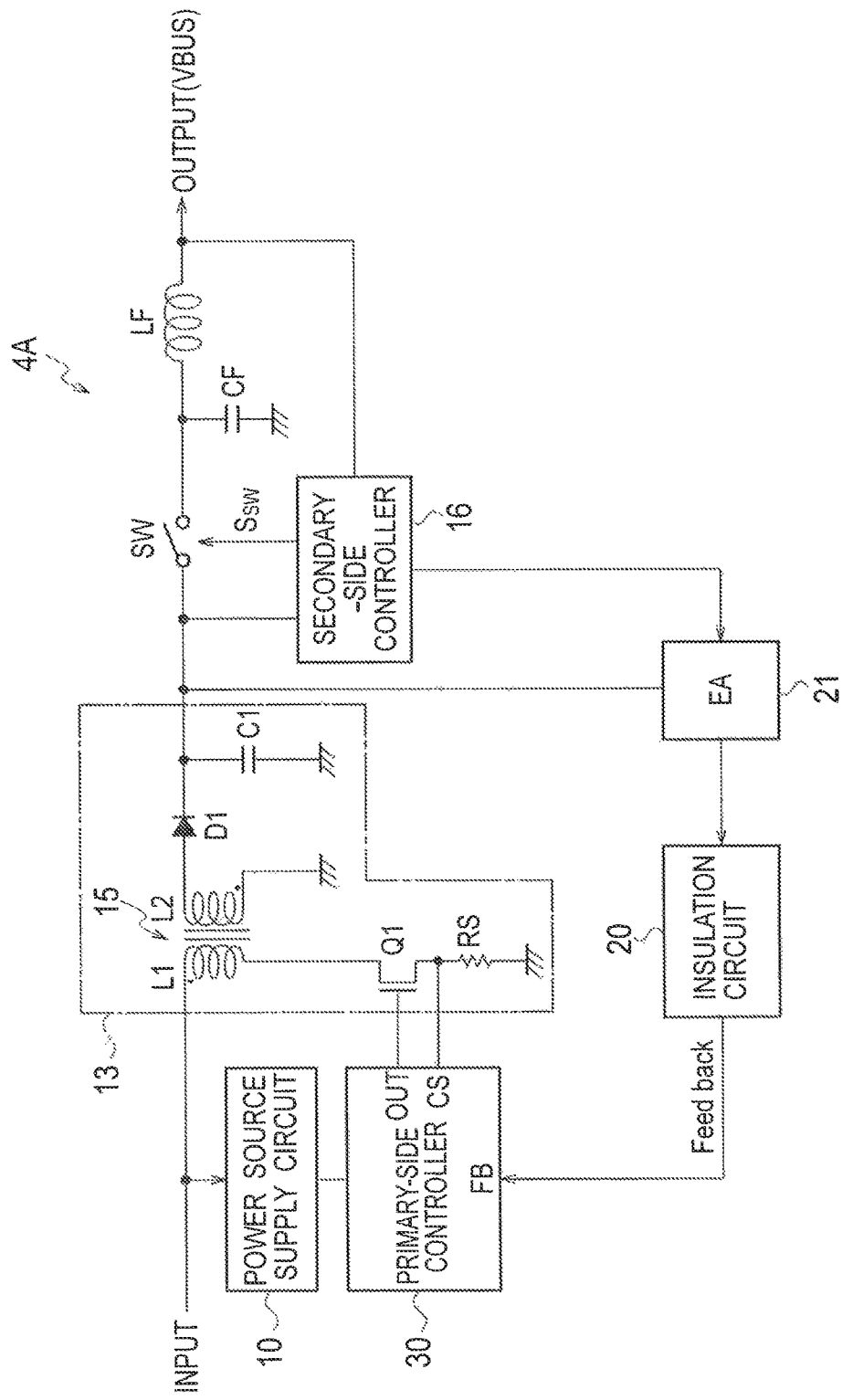
FIG. 1 is a schematic circuit block configuration diagram showing a PD device according to basic technology.

Next, certain embodiments will be described with reference to drawings. In the description of the following drawings, the identical or similar reference numeral is attached to the identical or similar part. However, it should be noted that the drawings are schematic and the relation between thickness and the plane size and the ratio of the thickness of each component part differs from an actual thing. Therefore, detailed thickness and size should be determined in consideration of the following explanation.

Of course, the part from which the relation and ratio of a mutual size differ also in mutually drawings is included. Moreover, the embodiments described hereinafter merely exemplify the device and method for materializing the technical idea; and the embodiments do not specify the material, shape, structure, placement, etc. of each component part as the following. The embodiments may be changed without departing from the spirit or scope of claims.

[Basic Technology]

As shown in FIG. 1, a PD device 4A according to a basic technology includes: a DC/DC converter 13 disposed between an input and an output, DC/DC converter 13 including a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 connected between the input and the primary-side controller 30, the power source supply circuit 10 configured to supply a power source to the primary-side controller 30; a secondary-side controller 16 connected to the output, the secondary-side controller 16 capable of controlling an output voltage Vo and an output current Io; an error amplifier 21 for error compensation connected to an output of the DC/DC converter 13 and the secondary-side controller 16; and an insulation circuit 20 connected to the error amplifier 21, the insulation circuit 20 configured to feedback output information to the primary-side controller 30.

Moreover, the secondary-side controller 16 may be connected to the output (VBUS) through an AC coupling capacitor CC.

Moreover, as shown in FIG. 1, the PD device 4A according to the basic technology includes: a switch SW configured to interrupt the output of the DC/DC converter 13 and the power line output (VBUS); and a filter circuit (LF, CF) disposed between the switch SW and the power line output (VBUS). ON/OFF control for the switch SW can be executed by the secondary-side controller 16.

An AC signal is superimposed to be input into the power line output (VBUS) from an outside, in the PD device 4A according to the basic technology.

In the PD device 4A according to the basic technology, the control input signal is input into the secondary-side controller 16 through the AC coupling capacitor CC from the power line output (VBUS), and electric power information at the output side is fed back to the primary-side controller 30 through the error amplifier 18 and the insulation circuit 20. The primary-side controller 30 controls ON/OFF of the MOS transistor Q1, thereby stabilizing the output voltage.

Moreover, in the PD device 4A according to the basic technology, an amount of current conducted to the primary-side inductance L1 is detected by the current sensing resistor RS, and an amount of current, e.g. a primary-side overcurrent, is controlled in the primary-side controller 30. As a consequence, the PD device 4A according to the basic technology has a variable function of an output voltage value and available output current capacity (MAX value).

In the PD device 4A according to the basic technology, the variable function of the output voltage value and the available output current capacity (MAX value) of the step-down (buck) type DC/DC converter 13 is realized by the feedback control from the secondary-side controller 16 to the primary-side controller 30. Accordingly, a relationship between the output voltage Vo and the output currents Io can be varied (variable function) in accordance with loads (e.g., smart phones, laptop PCs, tablet PCs, etc.) connected to the output.

The inductance LF formed with a filter coil at the output side is a separating inductance. More specifically, the filter circuit including the inductance LF and the capacitor CF separates a control signal from the DC/DC converter in order that the control input signal from the output is not input into the DC/DC converter 13. The inductance LF has relatively large mounting space, and hereby obstructing miniaturization and cost reduction.

[First Embodiment]

Figure 2:
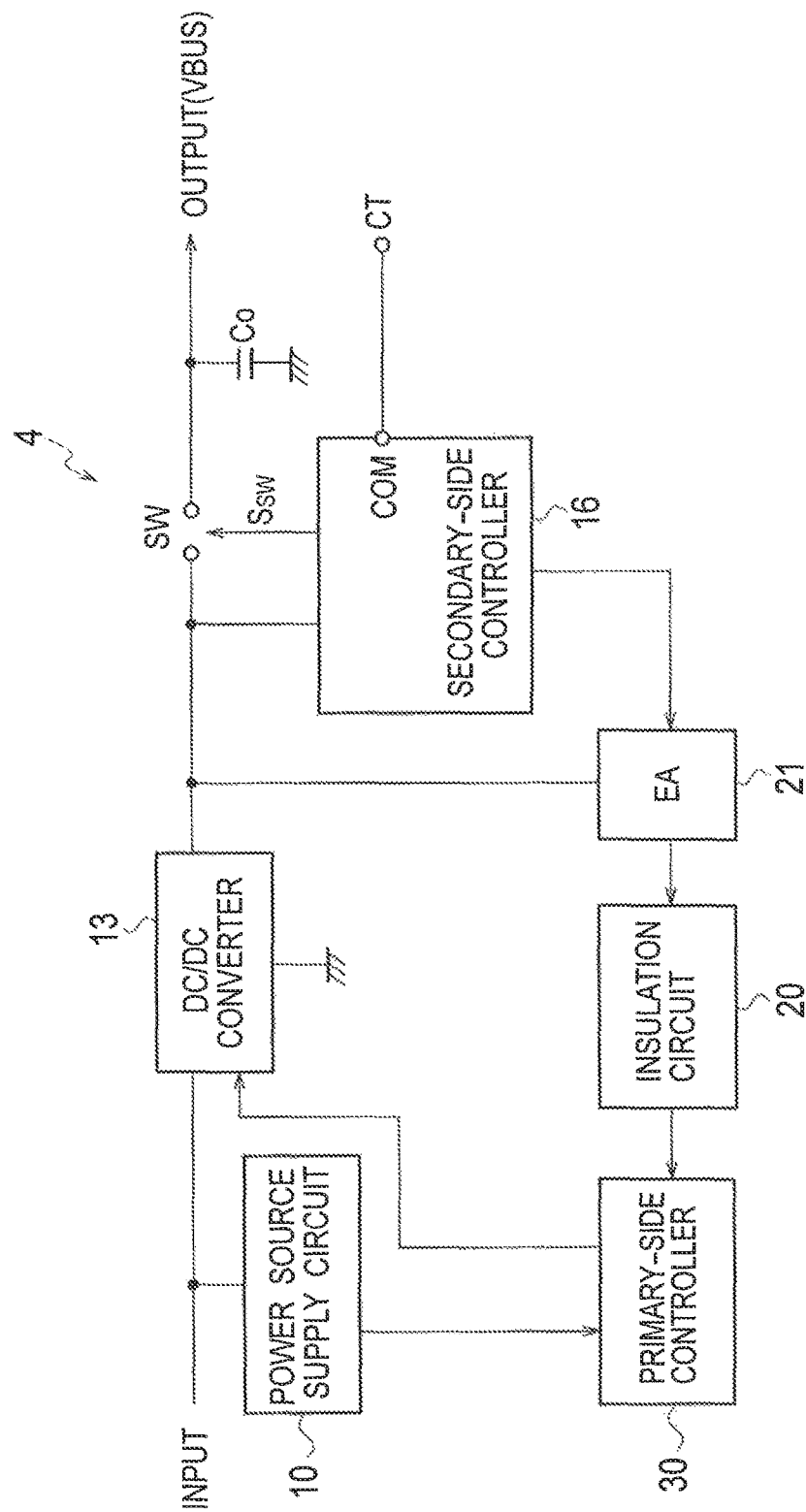
FIG. 2 is a schematic circuit block configuration diagram showing a PD device according to a first embodiment.

As shown in FIG. 2, a PD device 4 according to a first embodiment includes: a DC/DC converter 13 disposed between an input and an output; a primary-side controller 30 configured to control an input current of the DC/DC converter 13; and a secondary-side controller 16 coupled to a control input, the secondary-side controller 16 configured to receive a control input signal of the control input, and then feedback the received control input signal to the primary-side controller 30. In the present embodiment, the control input signal of the control input is input into a communication terminal COM of the secondary-side controller 16. Moreover, the primary-side controller 30 varies an output voltage value and an available output current capacity (MAX value) of the DC/DC converter 13 by controlling the input current on the basis of the control input signal fed back from the secondary-side controller 16. Moreover, an output capacitor CO is connected between the power line output (VBUS) and a ground potential.

As shown in FIG. 2, there may be included a control terminal CT, and the control input may be coupled to the control terminal CT. Moreover, a control output signal of the PD device 4 according to the first embodiment can be output to an external apparatus through the control terminal CT.

Moreover, the PD device 4 according to the first embodiment may include an AC coupling capacitor CC coupled to the control input, and the secondary-side controller 16 may be connected to the control input through the AC coupling capacitor CC.

Moreover, the control input may be directly connected to the secondary-side controller 16. More specifically, the control input signal of the control input may be directly input to the secondary-side controller 16 without through the AC coupling capacitor CC.

Moreover, as shown in FIG. 2, the PD device 4 according to the first embodiment may include the insulation circuit 20 connected to the secondary-side controller 16, the insulation circuit 20 configured to feedback the control input signal to the primary-side controller 30. A capacitor, a photo coupler, a transformer, etc. is applicable to the insulation circuit 20. Moreover, as usage, a bidirectional transformer having an insulated driver, a bilateral device, etc. may also be applied thereto.

Moreover, as shown in FIG. 2, the PD device 4 according to the first embodiment may include the error amplifier 21 for error compensation connected to the secondary-side controller 16, the error amplifier 21 configured to feedback the control input signal to the insulation circuit 20. The error amplifier 21 is controlled by the secondary-side controller 16 and can execute an error compensation of the control input signal to be fed back to the insulation circuit 20.

Moreover, as shown in FIG. 2, the PD device 4 according to the first embodiment may include the switch SW connected to the output of the DC/DC converter 13, the switch SW configured to interrupt an output voltage of the DC/DC converter 13. The output of the DC/DC converter 13 and the power line output (VBUS) can be interrupted by the switch SW. ON/OFF control for the switch SW can be executed by the secondary-side controller 16. The switch SW may include a Metal Oxide Semiconductor Field Effect Transistor (MOSFET).

Moreover, as shown in FIG. 2, the PD device 4 according to the first embodiment may include a power source supply circuit 10 connected between an input of the DC/DC converter 13 and the primary-side controller 30, the power source supply circuit 10 configured to supply electric power to the primary-side controller 30.

In the PD device 4 according to the first embodiment, there is included the control input in addition to the power line output (VBUS), instead of the basic technology with which the AC signal is superimposed to be input into the power line output (VBUS) from the outside. Accordingly, the separating inductance LF is not necessarily required. More specifically, there is no need to separate the control signal from the DC/DC converter by the filter circuit including the inductance LF and the capacitor CF in order that the control input signal from the output is not input into the DC/DC converter 13. Accordingly, mounting space can be relatively reduced, and therefore miniaturization and cost reduction can be realized, in the PD device 4 according to the first embodiment.

In the PD device 4 according to the first embodiment, the control input signal is input from the control input to the secondary-side controller 16 through the AC coupling capacitor CC, and control information including electric power information at the output side is fed back to the primary-side controller 30 through the error amplifier 18 and the insulation circuit 20 in accordance with the control input signal. The primary-side controller 30 controls ON/OFF of the MOS transistor Q1, thereby stabilizing the output voltage.

In the PD device 4 according to the first embodiment, the variable function of the output voltage value and the available output current capacity (MAX value) of the step-down (buck) type DC/DC converter 13 is realized by the feedback control from the secondary-side controller 16 to the primary-side controller 30. Accordingly, a relationship between the output voltage Vo and the output currents Io can be varied (variable function) in accordance with loads (e.g., smart phones, laptop PCs, tablet PCs, etc.) connected to the output.

Figure 3A:
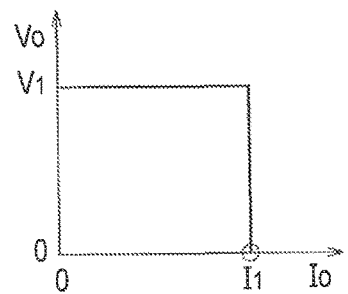
FIG. 3A is a schematic diagram showing a relationship of an output voltage and an output current obtained using the PD device according to the first embodiment, which is an example of a rectangular shape showing a Constant Voltage Constant Current (CVCC).
Figure 3B:
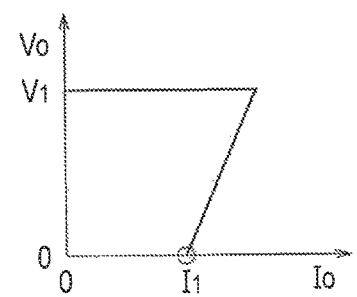
FIG. 3B is a schematic diagram showing the relationship of the output voltage and the output current obtained using the PD device according to the first embodiment, which is an example of a fold-back shape of an inverted trapezium.
Figure 3C:
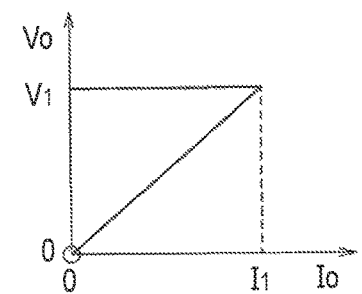
FIG. 3C is a schematic diagram showing the relationship of the output voltage and the output current obtained using the PD device according to the first embodiment, which is an example of a fold-back shape of an inverted triangle.
Figure 3D:
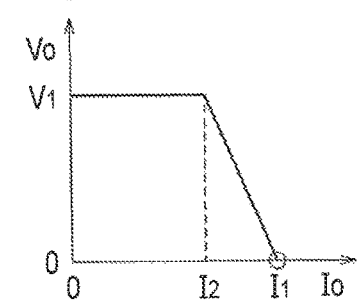
FIG. 3D is a schematic diagram showing the relationship of the output voltage and the output current obtained using the PD device according to the first embodiment, which is an example of a trapezoidal shape.
Figure 3E:
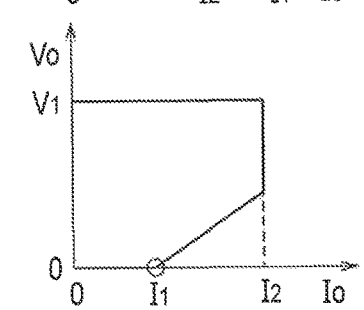
FIG. 3E is a schematic diagram showing the relationship of the output voltage and the output current obtained using the PD device according to the first embodiment, which is an example of a pentagon shape.

As the relationship between the output voltage Vo and the output current Io obtained by using the PD device 4 according to the first embodiment, there can be adopted various shape, e.g. a rectangular shape as shown in FIG. 3A, a fold-back shape of inverted trapezium as shown in FIG. 3B, a fold-back shape of inverted triangle as shown in FIG. 3C, a trapezoidal shape as shown in FIG. 3D, and a pentagonal shape as shown in FIG. 3E. For example, the rectangular shape shown in FIG. 3A is an example of Constant Voltage Constant Current (CVCC).

Figure 4A:
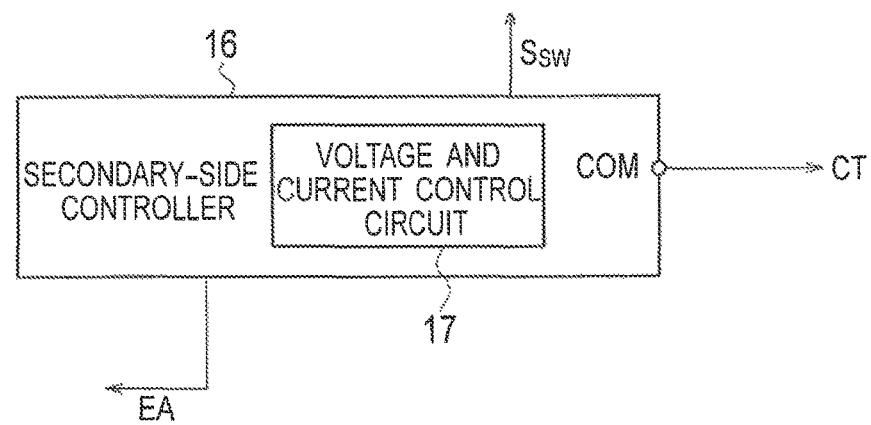
FIG. 4A is a schematic circuit block configuration diagram showing a secondary-side controller applied to the PD device according to the first embodiment.

As shown in FIG. 4A, the secondary-side controller 16 applied to the PD device according to the first embodiment includes a voltage and current control circuit 17 configured to execute determination of voltage and current on the basis of the control input signal, the voltage and current control circuit 17 configured to control the output voltage Vo and the output current Io. Moreover, the control input signal may include a signal based on a half-duplex communication system. For example, a frequency may be fixed at 150 kHz (300 kbps), and a pulse width of ON/OFF of "1"/"0" may be modulated.

Figure 4B:
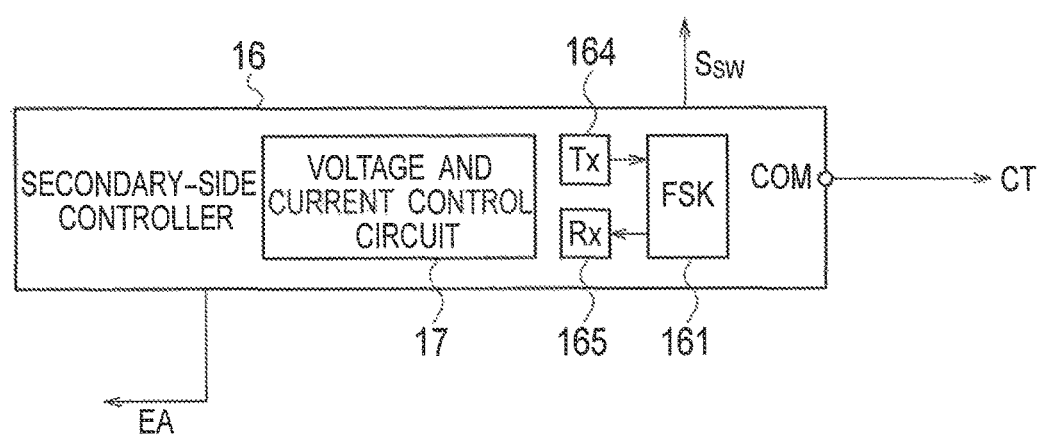
FIG. 4B is another schematic circuit block configuration diagram showing the secondary-side controller applied to the PD device according to the first embodiment.

Moreover, as shown in FIG. 4B, the secondary-side controller 16 applied to the PD device according to the first embodiment may further contain a frequency conversion circuit (FSK) 16I, a transmitter 164 and receiver 165. In the present embodiment, a frequency conversion from approximately 23.2 MHz to approximately 500 kHz, for example, can be realized by the frequency conversion circuit 16I, the transmitter 164, and the receiver 165.

In addition, also in the PD device 4 according to the first embodiment, another AC coupling capacitor CC for extracting the AC signals superimposed to be input into the power line output (VBUS) from an outside may be connected between the secondary-side controller 16 and the power line output (VBUS). In such a case, there will be required the separating inductance LF. More specifically, since it is required to separate the control input signal from the power line output (VBUS) in order that the control input signal is not input into the DC/DC converter 13, there will be required a filter circuit including the inductance LF and the capacitor CF. Thus, also in the PD device 4 according to the first embodiment, the power line output (VBUS)/AC superposition mode may be used in conjunction with the power line output (VBUS)/AC separation mode.

(Modified Examples)

The PD device 4 according to a modified example 1 of the first embodiment may include a secondary-side controller 16E in which the error amplifier 21 is contained, as shown in FIG. 5. More specifically, as shown in FIG. 5, the secondary-side controller 16E and the error amplifier 21 may be integrally formed with each other.

Figure 6:
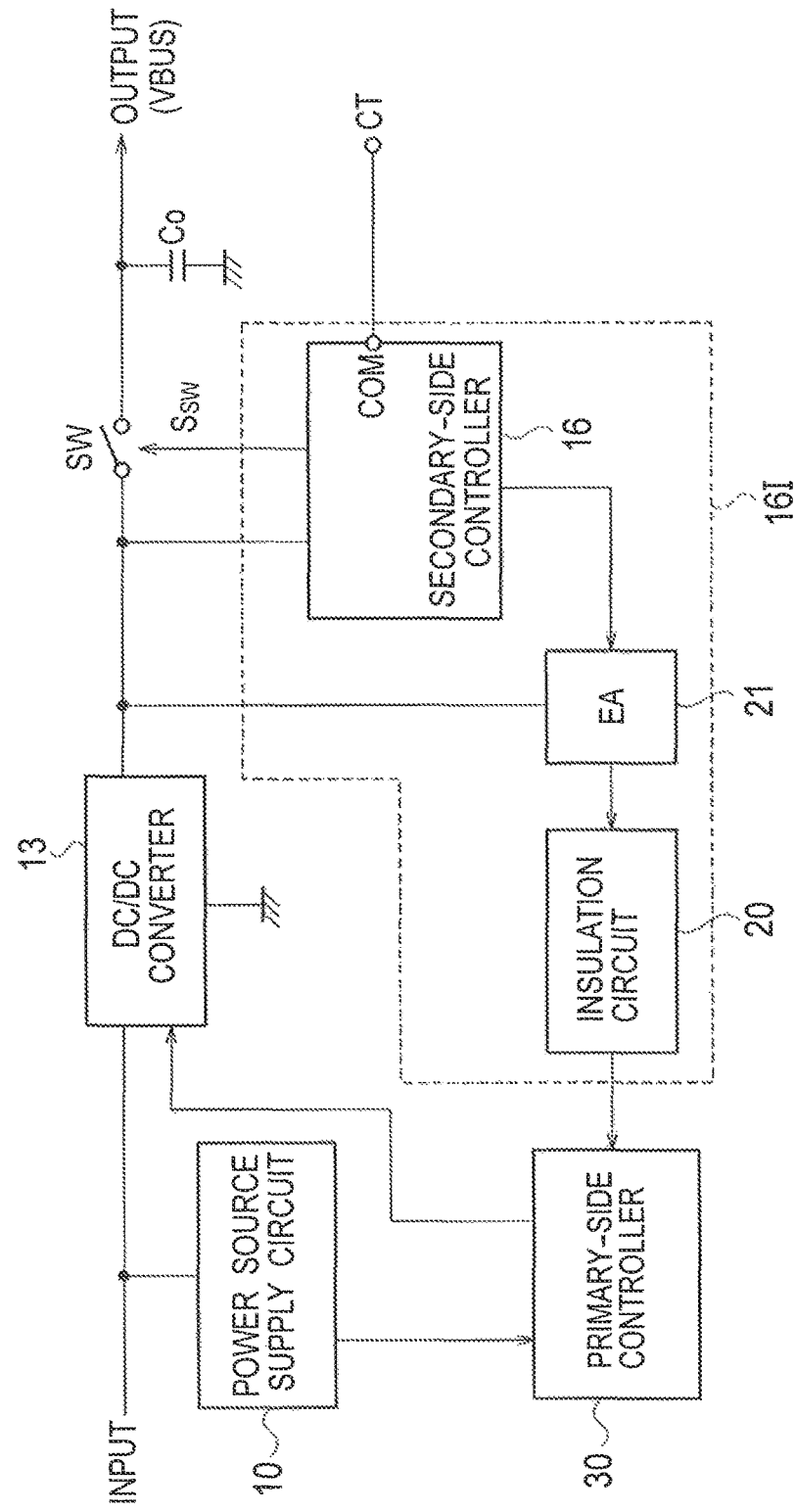
FIG. 6 is a schematic circuit block configuration diagram showing a PD device according to a modified example 2 of the first embodiment.

Moreover, a PD device 4 according to a modified example 2 of the first embodiment may include a secondary-side controller 16I in which the error amplifier 21 and the insulation circuit 20 are contained, as shown in FIG. 6. More specifically, as shown in FIG. 6, the secondary-side controller 16, the error amplifier 21, and the insulation circuit 20 may be integrally formed with one another.

Figure 7:
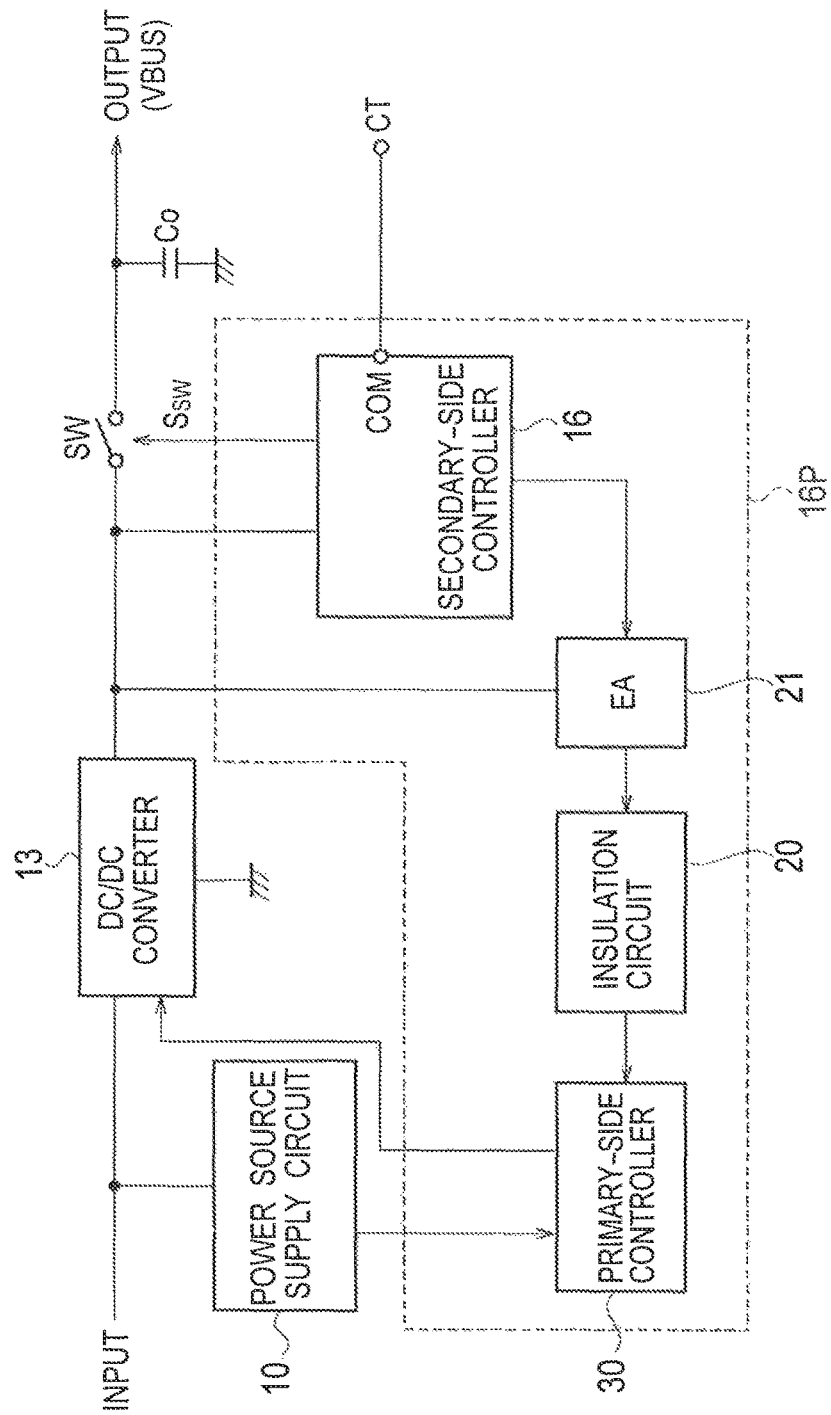
FIG. 7 is a schematic circuit block configuration diagram showing a PD device according to a modified example 3 of the first embodiment.

Moreover, a PD device 4 according to a modified example 3 of the first embodiment may include a secondary-side controller 16P in which the error amplifier 21, the insulation circuit 20, and the primary-side controller 30 are contained, as shown in FIG. 7. More specifically, as shown in FIG. 7, the secondary-side controller 16, the error amplifier 21, the insulation circuit 20, and the primary-side controller 30 may be integrally formed with one another.

According to the first embodiment and its modified examples, there can be provided the PD device, in which no filter coil is required for the output side and the mounting space is reduced, and thereby capable of achieving miniaturization and cost reduction, and capable of controlling the output voltage value and the available output current capacity (MAX value).

[Second Embodiment]

Figure 8:
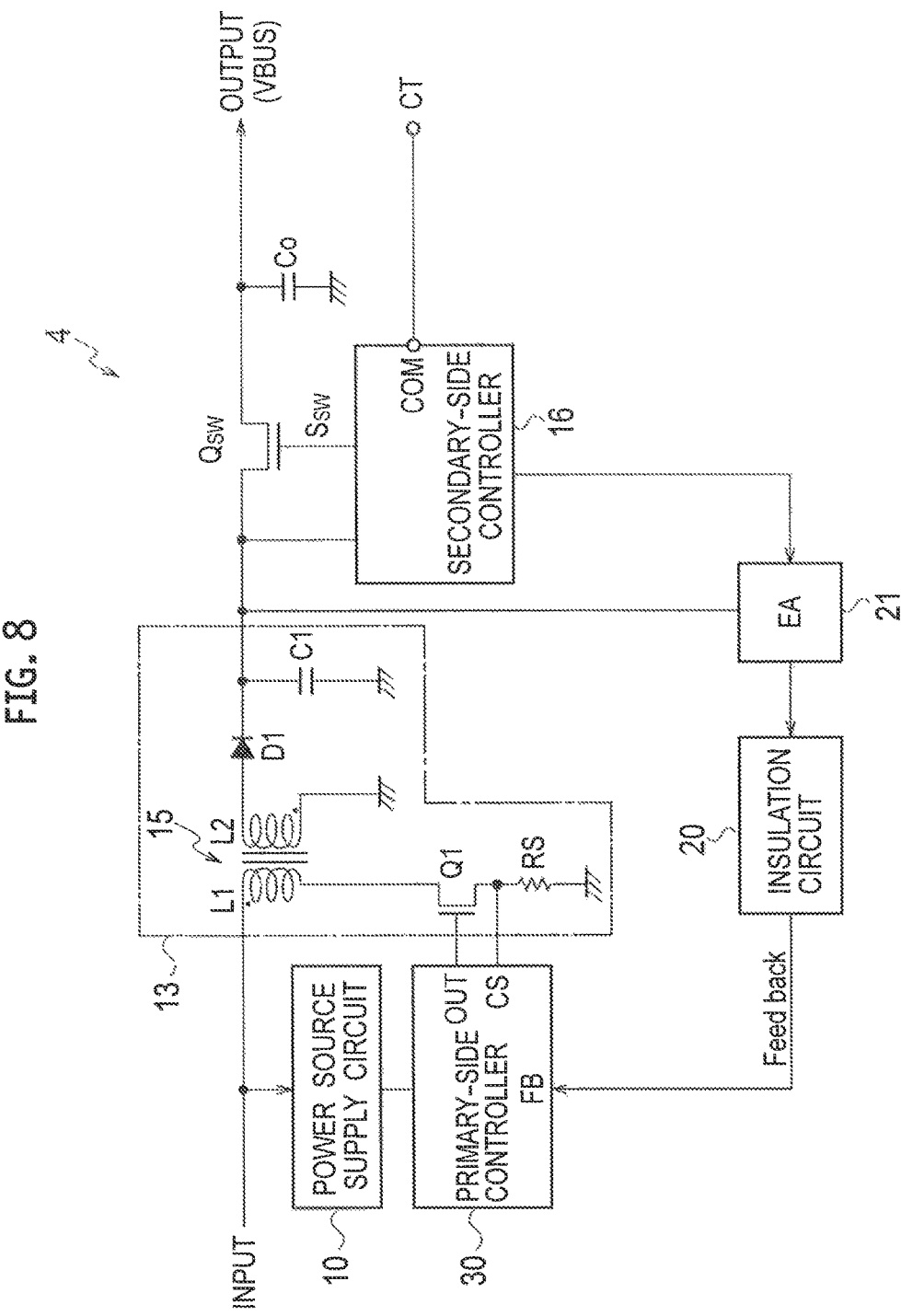
FIG. 8 is a schematic circuit block configuration diagram showing a PD device according to a second embodiment.

As shown in FIG. 8, a PD device 4 according to a second embodiment includes: a DC/DC converter 13 disposed between an input and an output; a primary-side controller 30 configured to control an input current of the DC/DC converter 13; and a secondary-side controller 16 coupled to a control input, the secondary-side controller 16 configured to receive a control input signal of the control input, and then feedback the received control input signal to the primary-side controller 30. In the present embodiment, the control input signal of the control input is input into a communication terminal COM of the secondary-side controller 16.

Moreover, the primary-side controller 30 varies an output voltage value and an available output current capacity (MAX value) of the DC/DC converter 13 by controlling the input current on the basis of the control input signal fed back from the secondary-side controller 16.

Moreover, as shown in FIG. 8, there may be included a control terminal CT, and the control input may be coupled to the control terminal CT. Moreover, a control output signal of the PD device 4 according to the second embodiment can be output to an external apparatus through the control terminal CT.

In the PD device 4 according to the second embodiment, the DC/DC converter 13 is a diode rectification type converter. More specifically, the DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the output; and a first capacitor C1 connected between the output and the ground potential. Moreover, an output capacitor CO is connected between the power line output (VBUS) and a ground potential.

Moreover, the PD device 4 according to the second embodiment may include an AC coupling capacitor CC coupled to the control input, and the secondary-side controller 16 may be connected to the control input through the AC coupling capacitor CC.

Moreover, the control input may be directly connected to the secondary-side controller 16. More specifically, the control input signal of the control input may be directly input to the secondary-side controller 16 without through the AC coupling capacitor CC.

Moreover, as shown in FIG. 8, the PD device 4 according to the second embodiment may include the insulation circuit 20 connected to the secondary-side controller 16, the insulation circuit 20 configured to feedback the control input signal to the primary-side controller 30.

Moreover, as shown in FIG. 8, the PD device 4 according to the second embodiment may include the error amplifier 21 for error compensation connected to the secondary-side controller 16, the error amplifier 21 configured to feedback the control input signal to the insulation circuit 20.

Moreover, as shown in FIG. 8, the PD device 4 according to the second embodiment may include a Metal Oxide Semiconductor (MOS) switch QSW connected to the output of the DC/DC converter 13, the MOS switch QSW configured to interrupt an output voltage of the DC/DC converter 13. The output of the DC/DC converter 13 and the power line output (VBUS) can be interrupted by the MOS switch QSW. ON/OFF control for the MOS switch QSW can be executed by the secondary-side controller 16.

Moreover, as shown in FIG. 8, the PD device 4 according to the second embodiment may include a power source supply circuit 10 connected between an input of the DC/DC converter 13 and the primary-side controller 30, the power source supply circuit 10 configured to supply electric power to the primary-side controller 30.

Since the other control input is included therein in addition to the power line output (VBUS), mounting space can be relatively reduced, and therefore miniaturization and cost reduction can be realized, in the PD device 4 according to the second embodiment.

Moreover, in the PD device 4 according to the second embodiment, an amount of current conducted to the primary-side inductance L1 is detected by the current sensing resistor RS, and an amount of current, e.g. a primary-side overcurrent, is controlled in the primary-side controller 30. As a consequence, the PD device 4 according to the second embodiment has a variable function of an output voltage value and available output current capacity (MAX value).

In the PD device 4 according to the second embodiment, the control input signal is input from the control input to the secondary-side controller 16 through the AC coupling capacitor CC, and control information including electric power information at the output side is fed back to the primary-side controller 30 through the error amplifier 18 and the insulation circuit 20 in accordance with the control input signal. The primary-side controller 30 controls ON/OFF of the MOS transistor Q1, thereby stabilizing the output voltage. Other configurations are the same as those of the first embodiment.

In addition, also in the PD device 4 according to the second embodiment, the power line output (VBUS)/AC superposition mode may be used in conjunction with the power line output (VBUS)/AC separation mode.

According to the second embodiment, there can be provided the PD device, in which no filter coil is required for the output side and the mounting space is reduced, and thereby capable of achieving miniaturization and cost reduction, and capable of controlling the output voltage value and the available output current capacity (MAX value).

[Third Embodiment]

Figure 9:
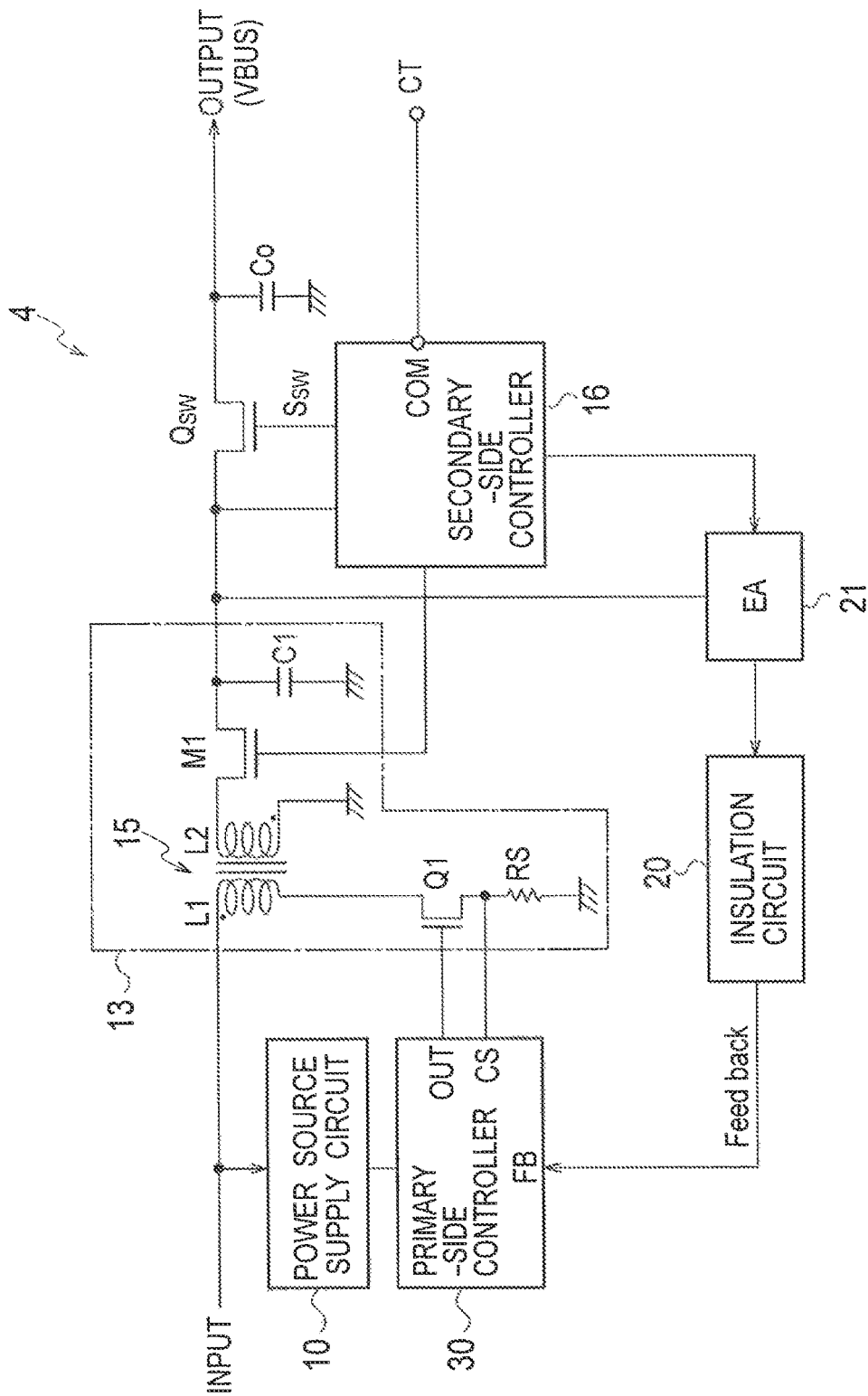
FIG. 9 is a schematic circuit block configuration diagram showing a PD device according to a third embodiment.

As shown in FIG. 9, a PD device 4 according to a third embodiment includes: a DC/DC converter 13 disposed between an input and an output; a primary-side controller 30 configured to control an input current of the DC/DC converter 13; and a secondary-side controller 16 coupled to a control input, the secondary-side controller 16 configured to receive a control input signal of the control input, and then feedback the received control input signal to the primary-side controller 30. In the present embodiment, the control input signal of the control input is input into a communication terminal COM of the secondary-side controller 16. Moreover, the primary-side controller 30 varies an output voltage value and an available output current capacity (MAX value) of the DC/DC converter 13 by controlling the input current on the basis of the control input signal fed back from the secondary-side controller 16.

Moreover, as shown in FIG. 9, there may be included a control terminal CT, and the control input may be coupled to the control terminal CT. Moreover, a control output signal of the PD device 4 according to the third embodiment can be output to an external apparatus through the control terminal CT.

In the PD device 4 according to the third embodiment, the DC/DC converter 13 is a synchronous rectification type converter. More specifically, the DC/DC converter 13 includes: a transformer 15; a first MOS transistor Q1 and a current sensing resistor RS each connected in series between the primary-side inductance L1 of the transformer 15 and ground potential; a second MOS transistor M1 connected between the secondary-side inductance L2 of the transformer 15 and the output; and a first capacitor C1 connected between the output and the ground potential. Moreover, an output capacitor CO is connected between the power line output (VBUS) and a ground potential.

Moreover, the PD device 4 according to the third embodiment may include an AC coupling capacitor CC coupled to the control input, and the secondary-side controller 16 may be connected to the control input through the AC coupling capacitor CC.

Moreover, the control input may be directly connected to the secondary-side controller 16. More specifically, the control input signal of the control input may be directly input to the secondary-side controller 16 without through the AC coupling capacitor CC.

Since the other control input is included therein in addition to the power line output (VBUS), mounting space can be relatively reduced, and therefore miniaturization and cost reduction can be realized, in the PD device 4 according to the third embodiment.

In the PD device 4 according to the third embodiment, the control input signal is input from the control input to the secondary-side controller 16 through the AC coupling capacitor CC, and control information including electric power information at the output side is fed back to the primary-side controller 30 through the error amplifier 21 and the insulation circuit 20 in accordance with the control input signal. The primary-side controller 30 controls ON/OFF of the MOS transistor Q1, thereby stabilizing the output voltage.

In the PD device 4 according to the third embodiment, since the synchronous rectification method is adopted for the DC/DC converter, instead of the diode rectification system, DC/DC power conversion efficiency can be increased, compared with the first to second embodiments adapting the diode rectification system. Other configurations are the same as those of the first embodiment.

In addition, also in the PD device 4 according to the third embodiment, the power line output (VBUS)/AC superposition mode may be used in conjunction with the power line output (VBUS)/AC separation mode.

According to the third embodiment, there can be provided the PD device, in which no filter coil is required for the output side and the mounting space is reduced, and thereby capable of achieving miniaturization and cost reduction, and capable of controlling the output voltage value and the available output current capacity (MAX value).

[Fourth Embodiment]

Figure 10:
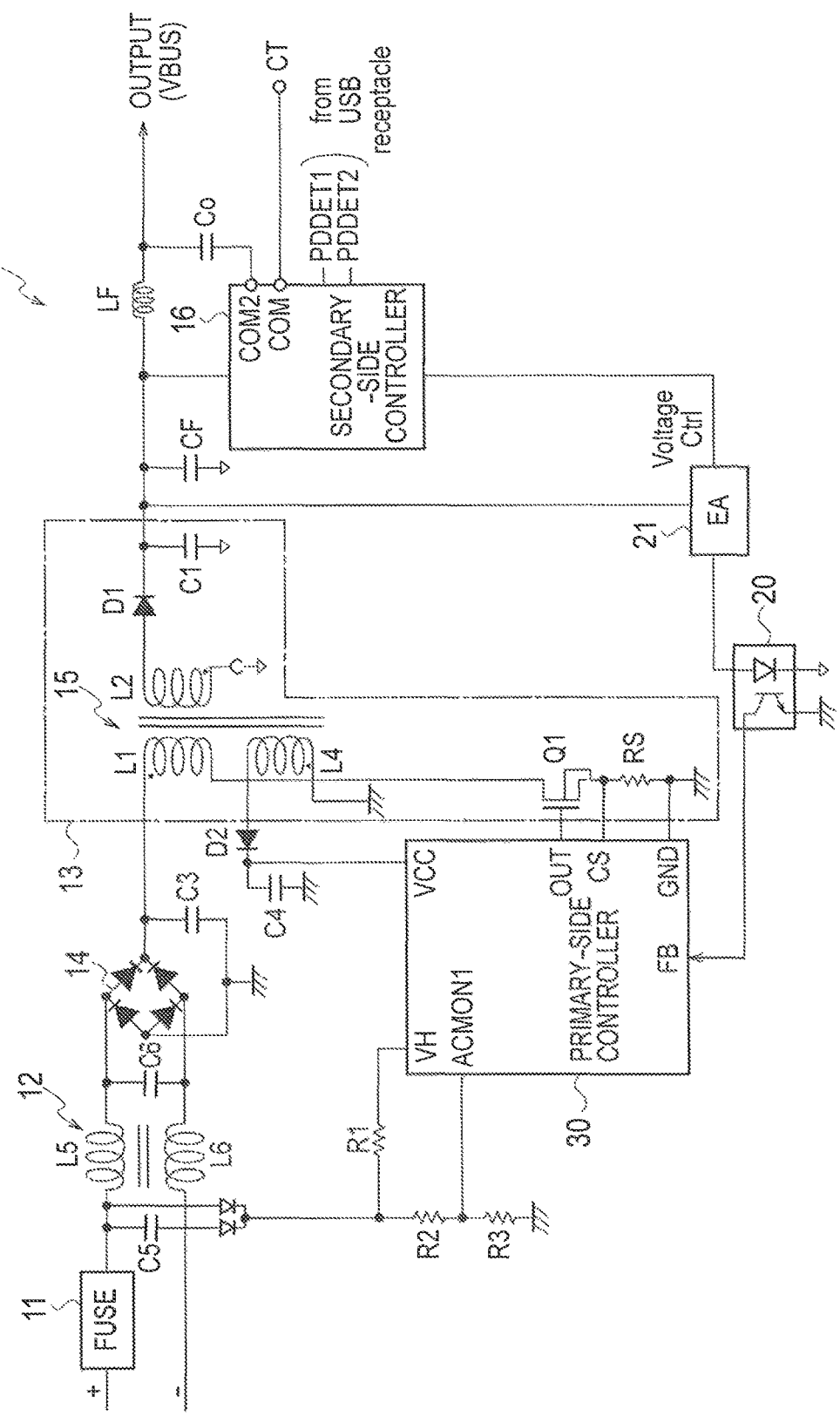
FIG. 10 is a schematic circuit block configuration diagram showing a PD device according to a fourth embodiment.

As shown in FIG. 10, a PD device 4 according to a fourth embodiment includes an AC/DC converter connected to an AC input, the AC/DC converter 300 composed of a fuse 11, a choke coil 12, a diode rectification bridge 14, capacitors C5, C6, C3, instead of the power source supply circuit 10 as in the first embodiment.

Moreover, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 10, a PD device 4 according to the fourth embodiment includes: a DC/DC converter 13 disposed between an input (DC output of the AC/DC converter) and an output; a primary-side controller 30 configured to control an input current of the DC/DC converter 13; and a secondary-side controller 16 coupled to a control input, the secondary-side controller 16 configured to receive a control input signal of the control input, and then feedback the received control input signal to the primary-side controller 30. In the present embodiment, the control input signal of the control input is input into a communication terminal COM of the secondary-side controller 16. Moreover, the primary-side controller 30 varies an output voltage value and an available output current capacity (MAX value) of the DC/DC converter 13 by controlling the input current on the basis of the control input signal fed back from the secondary-side controller 16.

Moreover, as shown in FIG. 10, there may be included a control terminal CT, and the control input may be coupled to the control terminal CT. Moreover, a control output signal of the PD device 4 according to the fourth embodiment can be output to an external apparatus through the control terminal CT.

Although PDDET1, PDDET2 from USB receptacle are described on the secondary-side controller 16, the PDDET1, PDDET2 may be omitted.

In the PD device 4 according to the fourth embodiment, the DC/DC converter 13 is a diode rectification type converter. More specifically, the DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the output; and a first capacitor C1 connected between the output and the ground potential.

Moreover, an output capacitor CO is connected between the power line output (VBUS) and a communication terminal COM2 of the secondary-side controller 16, and thereby an AC signal superimposed on the power line output (VBUS) can be input.

Moreover, the PD device 4 according to the fourth embodiment may include an AC coupling capacitor CC coupled to the control input, and the secondary-side controller 16 may be connected to the control input through the AC coupling capacitor CC.

Moreover, the control input may be directly connected to the secondary-side controller 16. More specifically, the control input signal of the control input may be directly input to the secondary-side controller 16 without through the AC coupling capacitor CC.

Although a filter circuit including an inductance LF and a capacitor CF is illustrated in FIG. 10, such a filter circuit is not necessarily required therefor.

Since the other control input is included therein in addition to the power line output (VBUS), mounting space can be relatively reduced, and therefore miniaturization and cost reduction can be realized, in the PD device 4 according to the fourth embodiment.

In the PD device 4 according to the fourth embodiment, the control input signal is input from the control input to the secondary-side controller 16 through the AC coupling capacitor CC, and control information including electric power information at the output side is fed back to the primary-side controller 30 through the error amplifier 21 and the insulation circuit 20 in accordance with the control input signal. The primary-side controller 30 controls ON/OFF of the MOS transistor Q1, thereby stabilizing the output voltage. Other configurations are the same as those of the first embodiment. Also in the PD device 4 according to the fourth embodiment, the power line output (VBUS)/AC superposition mode may be used in conjunction with the power line output (VBUS)/AC separation mode.

According to the fourth embodiment, there can be provided the PD device, in which no filter coil is required for the output side and the mounting space is reduced, and thereby capable of achieving miniaturization and cost reduction, and capable of controlling the output voltage value and the available output current capacity (MAX value).

[Fifth Embodiment]

Figure 11:
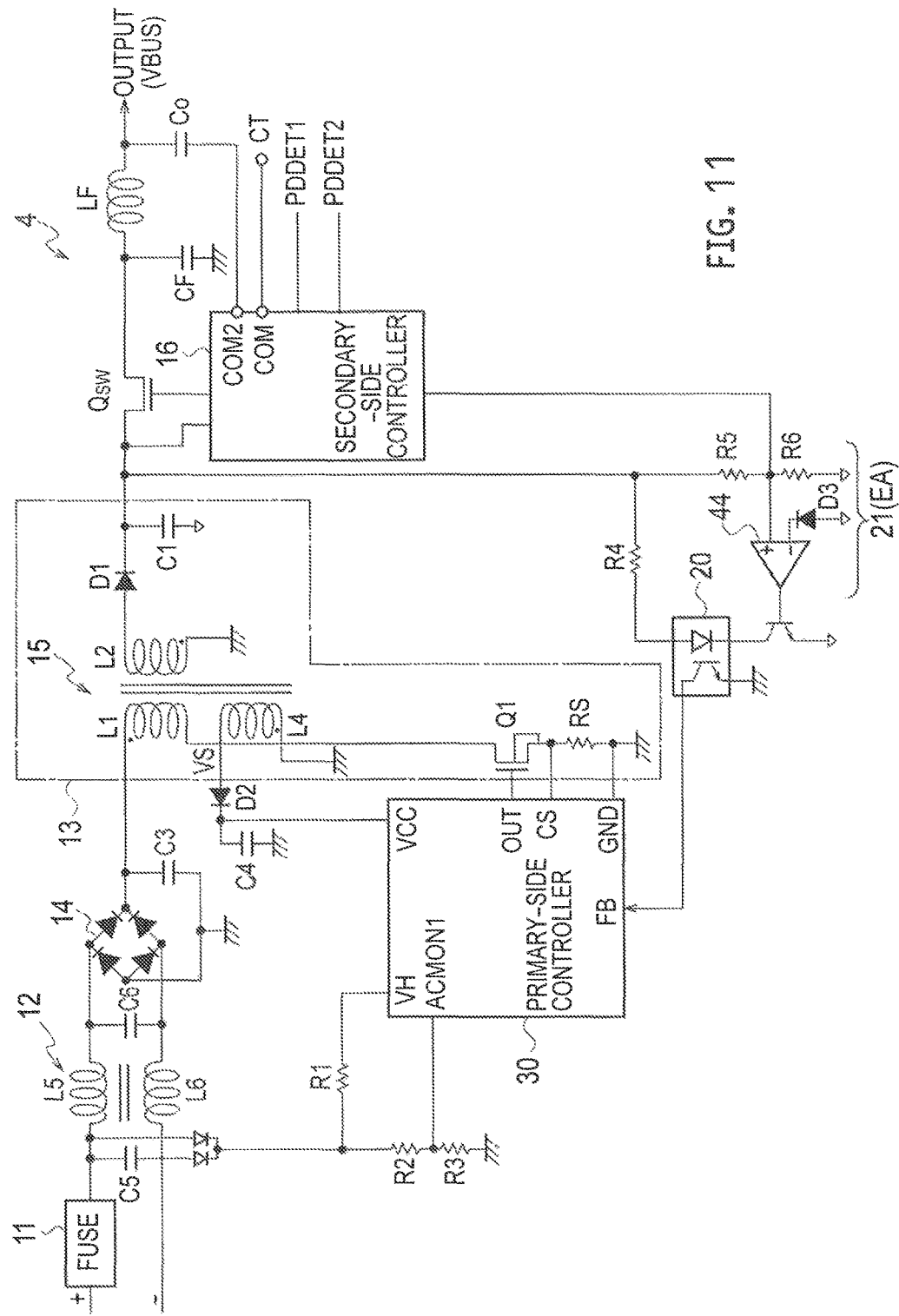
FIG. 11 is a schematic circuit block configuration diagram showing a PD device according to a fifth embodiment.

As shown in FIG. 11, a PD device 4 according to the fifth embodiment includes an AC/DC converter connected to an AC input, the AC/DC converter 300 composed of a fuse 11, a choke coil 12, a diode rectification bridge 14, capacitors C5, C6, C3, instead of the power source supply circuit 10 as in the first embodiment.

Moreover, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 11, the PD device 4 according to the fifth embodiment includes: a DC/DC converter 13 disposed between an input (DC output of the AC/DC converter) and an output; a primary-side controller 30 configured to control an input current of the DC/DC converter 13; and a secondary-side controller 16 coupled to a control input, the secondary-side controller 16 configured to receive a control input signal of the control input, and then feedback the received control input signal to the primary-side controller 30. In the present embodiment, the control input signal of the control input is input into a communication terminal COM of the secondary-side controller 16. Moreover, the primary-side controller 30 varies an output voltage value and an available output current capacity (MAX value) of the DC/DC converter 13 by controlling the input current on the basis of the control input signal fed back from the secondary-side controller 16.

Moreover, as shown in FIG. 11, there may be included a control terminal CT, and the control input may be coupled to the control terminal CT. Moreover, a control output signal of the PD device 4 according to the fifth embodiment can be output to an external apparatus through the control terminal CT.

Although PDDET1, PDDET2 from USB receptacle are described on the secondary-side controller 16, the PDDET1, PDDET2 may be omitted.

In the PD device 4 according to the fifth embodiment, the DC/DC converter 13 is a diode rectification type converter. More specifically, the DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the output; and a first capacitor C1 connected between the output and the ground potential.

Moreover, an output capacitor CO is connected between the power line output (VBUS) and a communication terminal COM2 of the secondary-side controller 16, and thereby an AC signal superimposed on the power line output (VBUS) can be input.

Moreover, the PD device 4 according to the fifth embodiment may include an AC coupling capacitor CC coupled to the control input, and the secondary-side controller 16 may be connected to the control input through the AC coupling capacitor CC.

Moreover, the control input may be directly connected to the secondary-side controller 16. More specifically, the control input signal of the control input may be directly input to the secondary-side controller 16 without through the AC coupling capacitor CC.

Moreover, as shown in FIG. 11, the PD device 4 according to the fifth embodiment may include the insulation circuit 20 connected to the secondary-side controller 16, the insulation circuit 20 configured to feedback the control input signal to the primary-side controller 30.

Moreover, as shown in FIG. 11, the PD device 4 according to the fifth embodiment may include the error amplifier 21 for error compensation connected to the secondary-side controller 16, the error amplifier 21 configured to feedback the control input signal to the insulation circuit 20. In the present embodiment, as shown in FIG. 11, the error amplifier 21 includes discrete components, e.g. a power amplifier 44, a diode D3, and resistors R5, R6.

Although a filter circuit including an inductance LF and a capacitor CF is illustrated in FIG. 11, such a filter circuit is not necessarily required therefor.

Since the other control input is included therein in addition to the power line output (VBUS), mounting space can be relatively reduced, and therefore miniaturization and cost reduction can be realized, in the PD device 4 according to the fifth embodiment.

In the PD device 4 according to the fifth embodiment, the control input signal is input from the control input to the secondary-side controller 16 through the AC coupling capacitor CC, and control information including electric power information at the output side is fed back to the primary-side controller 30 through the error amplifier 21 and the insulation circuit 20 in accordance with the control input signal. The primary-side controller 30 controls ON/OFF of the MOS transistor Q1, thereby stabilizing the output voltage. Other configurations are the same as those of the first embodiment.

Also in the PD device 4 according to the fifth embodiment, the power line output (VBUS)/AC superposition mode may be used in conjunction with the power line output (VBUS)/AC separation mode.

According to the fifth embodiment, there can be provided the PD device, in which no filter coil is required for the output side and the mounting space is reduced, and thereby capable of achieving miniaturization and cost reduction, and capable of controlling the output voltage value and the available output current capacity (MAX value).

[Sixth Embodiment]

Figure 12:
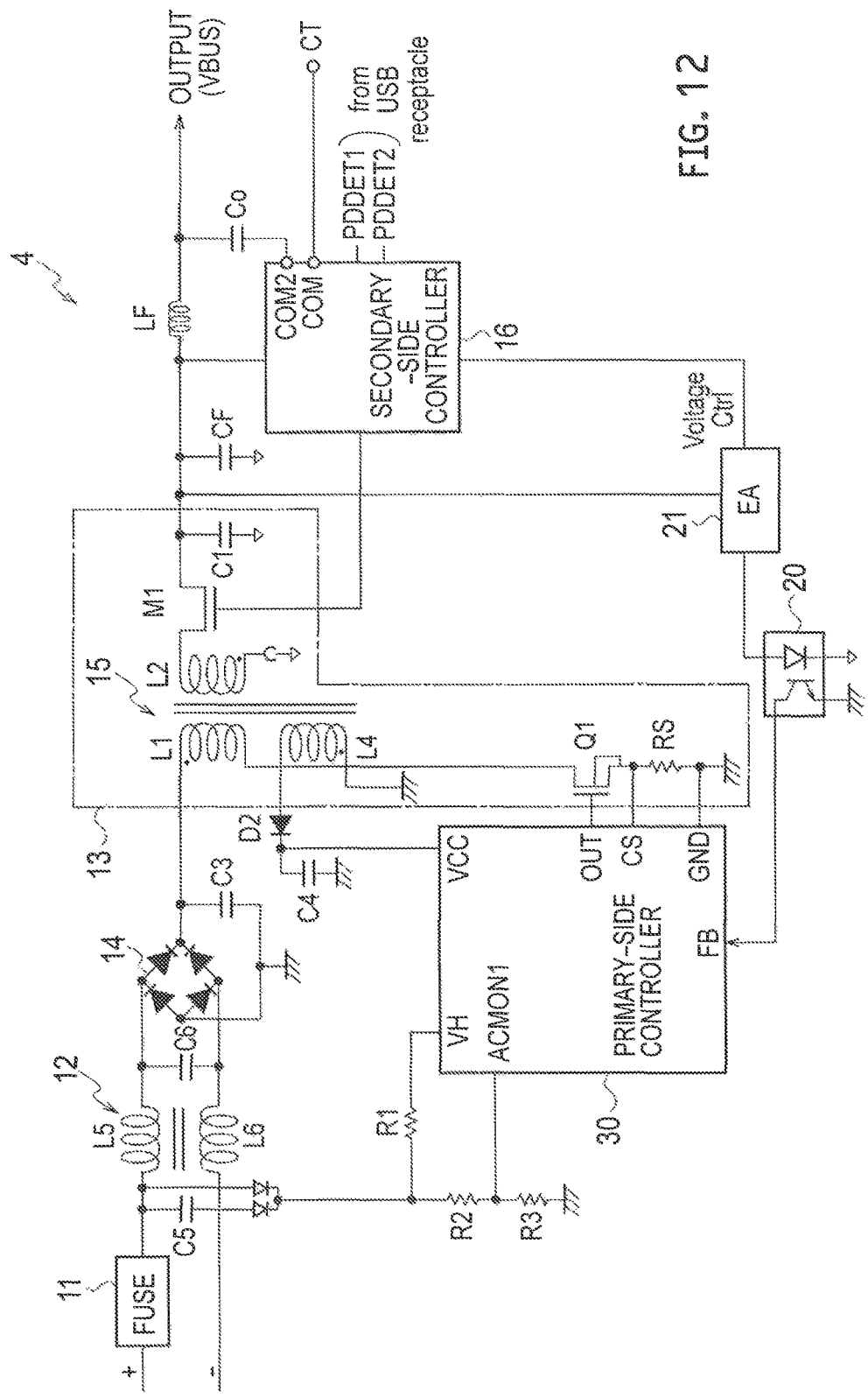
FIG. 12 is a schematic circuit block configuration diagram showing a PD device according to a sixth embodiment.

As shown in FIG. 12, a PD device 4 according to a sixth embodiment includes an AC/DC converter connected to an AC input, the AC/DC converter 300 composed of a fuse 11, a choke coil 12, a diode rectification bridge 14, capacitors C5, C6, C3, instead of the power source supply circuit 10 as in the third embodiment.

Moreover, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 12, the PD device 4 according to the sixth embodiment includes: a DC/DC converter 13 disposed between an input (DC output of the AC/DC converter) and an output; a primary-side controller 30 configured to control an input current of the DC/DC converter 13; and a secondary-side controller 16 coupled to a control input, the secondary-side controller 16 configured to receive a control input signal of the control input, and then feedback the received control input signal to the primary-side controller 30. In the present embodiment, the control input signal of the control input is input into a communication terminal COM of the secondary-side controller 16. Moreover, the primary-side controller 30 varies an output voltage value and an available output current capacity (MAX value) of the DC/DC converter 13 by controlling the input current on the basis of the control input signal fed back from the secondary-side controller 16.

Moreover, as shown in FIG. 12, there may be included a control terminal CT, and the control input may be coupled to the control terminal CT. Moreover, a control output signal of the PD device 4 according to the sixth embodiment can be output to an external apparatus through the control terminal CT.

Although PDDET1, PDDET2 from USB receptacle are described on the secondary-side controller 16, the PDDET1, PDDET2 may be omitted.

In the PD device 4 according to the sixth embodiment, the DC/DC converter 13 is a synchronous rectification type converter. More specifically, the DC/DC converter 13 includes: a transformer 15; a first MOS transistor Q1 and a current sensing resistor RS each connected in series between the primary-side inductance L1 of the transformer 15 and ground potential; a second MOS transistor M1 connected between the secondary-side inductance L2 of the transformer 15 and the output; and a first capacitor C1 connected between the output and the ground potential.

Moreover, an output capacitor CO is connected between the power line output (VBUS) and a communication terminal COM2 of the secondary-side controller 16, and thereby an AC signal superimposed on the power line output (VBUS) can be input.

Moreover, the PD device 4 according to the sixth embodiment may include an AC coupling capacitor CC coupled to the control input, and the secondary-side controller 16 may be connected to the control input through the AC coupling capacitor CC.

Moreover, the control input may be directly connected to the secondary-side controller 16. More specifically, the control input signal of the control input may be directly input to the secondary-side controller 16 without through the AC coupling capacitor CC.

Although a filter circuit including an inductance LF and a capacitor CF is illustrated in FIG. 12, such a filter circuit is not necessarily required therefor.

Since the other control input is included therein in addition to the power line output (VBUS), mounting space can be relatively reduced, and therefore miniaturization and cost reduction can be realized, in the PD device 4 according to the sixth embodiment.

In the PD device 4 according to the sixth embodiment, the control input signal is input from the control input to the secondary-side controller 16 through the AC coupling capacitor CC, and control information including electric power information at the output side is fed back to the primary-side controller 30 through the error amplifier 21 and the insulation circuit 20 in accordance with the control input signal. The primary-side controller 30 controls ON/OFF of the MOS transistor Q1, thereby stabilizing the output voltage.

In the PD device 4 according to the sixth embodiment, since the synchronous rectification method is adopted for the DC/DC converter, instead of the diode rectification system, and thereby DC/DC power conversion efficiency can be increased, compared with the second, fourth, and fifth embodiments adapting the diode rectification system. Other configurations are the same as those of the third embodiment.

Also in the PD device 4 according to the sixth embodiment, the power line output (VBUS)/AC superposition mode may be used in conjunction with the power line output (VBUS)/AC separation mode.

According to the sixth embodiment, there can be provided the PD device, in which no filter coil is required for the output side and the mounting space is reduced, and thereby capable of achieving miniaturization and cost reduction, and capable of controlling the output voltage value and the available output current capacity (MAX value).

[Seventh Embodiment]

Figure 13:
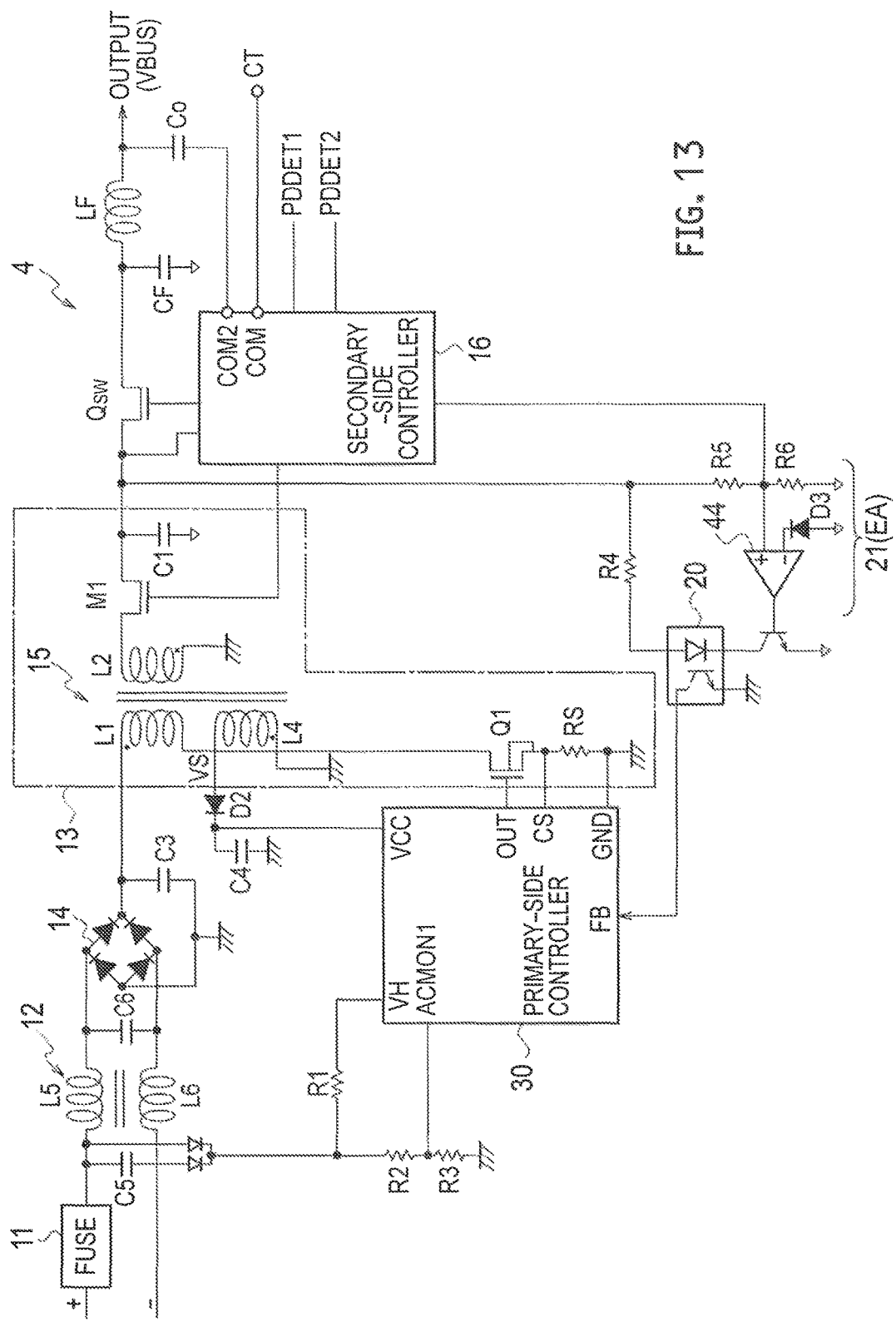
FIG. 13 is a schematic circuit block configuration diagram showing a PD device according to a seventh embodiment.

As shown in FIG. 13, a PD device 4 according to a seventh embodiment includes an AC/DC converter connected to an AC input, the AC/DC converter 300 composed of a fuse 11, a choke coil 12, a diode rectification bridge 14, capacitors C5, C6, C3, instead of the power source supply circuit 10 as in the third embodiment, in the same manner as the sixth embodiment.

Moreover, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 13, the PD device 4 according to the seventh embodiment includes: a DC/DC converter 13 disposed between an input (DC output of the AC/DC converter) and an output; a primary-side controller 30 configured to control an input current of the DC/DC converter 13; and a secondary-side controller 16 coupled to a control input, the secondary-side controller 16 configured to receive a control input signal of the control input, and then feedback the received control input signal to the primary-side controller 30. In the present embodiment, the control input signal of the control input is input into a communication terminal COM of the secondary-side controller 16. Moreover, the primary-side controller 30 varies an output voltage value and an available output current capacity (MAX value) of the DC/DC converter 13 by controlling the input current of the DC/DC converter 13 on the basis of the control input signal fed back from the secondary-side controller 16.

Moreover, as shown in FIG. 13, there may be included a control terminal CT, and the control input may be coupled to the control terminal CT. Moreover, a control output signal of the PD device 4 according to the seventh embodiment can be output to an external apparatus through the control terminal CT.

Although PDDET1, PDDET2 from USB receptacle are described on the secondary-side controller 16, the PDDET1, PDDET2 may be omitted.

In the PD device 4 according to the seventh embodiment, the DC/DC converter 13 is a synchronous rectification type converter. More specifically, the DC/DC converter 13 includes: a transformer 15; a first MOS transistor Q1 and a current sensing resistor RS each connected in series between the primary-side inductance L1 of the transformer 15 and ground potential; a second MOS transistor M1 connected between the secondary-side inductance L2 of the transformer 15 and the output; and a first capacitor C1 connected between the output and the ground potential.

Moreover, an output capacitor CO is connected between the power line output (VBUS) and a communication terminal COM2 of the secondary-side controller 16, and thereby an AC signal superimposed on the power line output (VBUS) can be input.

Moreover, the PD device 4 according to the seventh embodiment may include an AC coupling capacitor CC coupled to the control input, and the secondary-side controller 16 may be connected to the control input through the AC coupling capacitor CC.

Moreover, the control input may be directly connected to the secondary-side controller 16. More specifically, the control input signal of the control input may be directly input to the secondary-side controller 16 without through the AC coupling capacitor CC.

Moreover, as shown in FIG. 13, the PD device 4 according to the seventh embodiment may include the insulation circuit 20 connected to the secondary-side controller 16, the insulation circuit 20 configured to feedback the control input signal to the primary-side controller 30.

Moreover, as shown in FIG. 13, the PD device 4 according to the seventh embodiment may include the error amplifier 21 for error compensation connected to the secondary-side controller 16 and configured to feedback the control input signal to the insulation circuit 20. In the present embodiment, as shown in FIG. 11, the error amplifier 21 includes discrete components, e.g. a power amplifier 44, a diode D3, and resistors R5, R6.

Although a filter circuit including an inductance LF and a capacitor CF is illustrated in FIG. 13, such a filter circuit is not necessarily required therefor.

Since the other control input is included therein in addition to the power line output (VBUS), mounting space can be relatively reduced, and therefore miniaturization and cost reduction can be realized, in the PD device 4 according to the seventh embodiment.

In the PD device 4 according to the seventh embodiment, the control input signal is input from the control input to the secondary-side controller 16 through the AC coupling capacitor CC, and control information including electric power information at the output side is fed back to the primary-side controller 30 through the error amplifier 21 and the insulation circuit 20 in accordance with the control input signal. The primary-side controller 30 controls ON/OFF of the MOS transistor Q1, thereby stabilizing the output voltage.

In the PD device 4 according to the seventh embodiment, since the synchronous rectification method is adopted for the DC/DC converter, instead of the diode rectification system, and thereby DC/DC power conversion efficiency can be increased, compared with the second, fourth, and fifth embodiments adapting the diode rectification system. Other configurations are the same as those of the sixth embodiment.

Also in the PD device 4 according to the seventh embodiment, the power line output (VBUS)/AC superposition mode may be used in conjunction with the power line output (VBUS)/AC separation mode.

According to the seventh embodiment, there can be provided the PD device, in which no filter coil is required for the output side and the mounting space is reduced, and thereby capable of achieving miniaturization and cost reduction, and capable of controlling the output voltage value and the available output current capacity (MAX value).

[Eighth Embodiment]

Figure 14A:
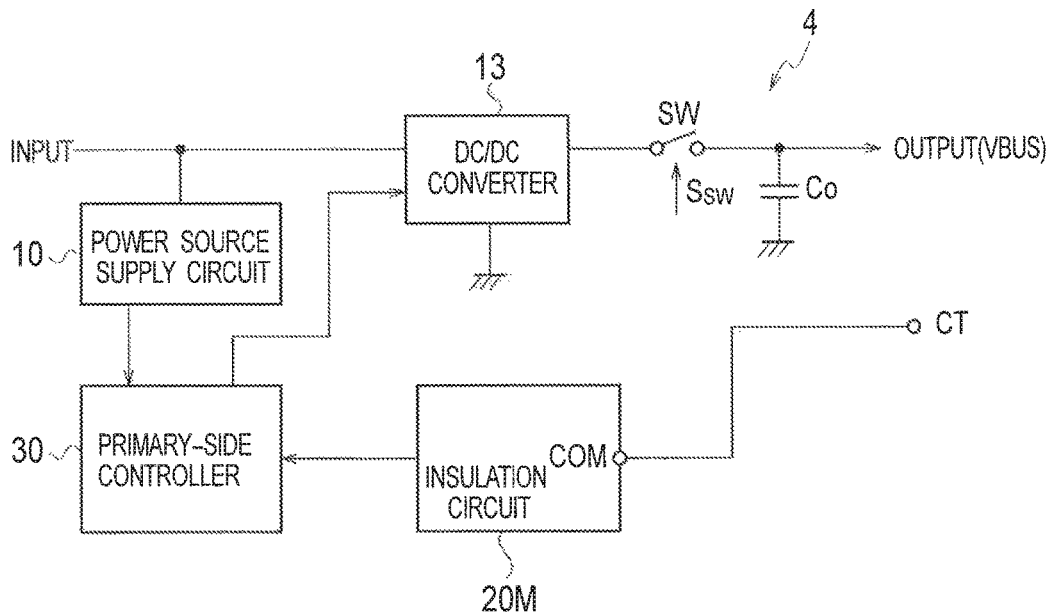
FIG. 14A is a schematic circuit block configuration diagram showing a PD device according to an eighth embodiment.

As shown in FIG. 14A, a PD device 4 according to an eighth embodiment includes: a DC/DC converter 13 disposed between an input and an output; a primary-side controller 30 configured to control an input current of the DC/DC converter 13; and an insulation circuit 20M connected to the control input and configured to feedback a control input signal of a control input to the primary-side controller 30. In the present embodiment, the control input signal of the control input is input into a communication terminal COM of the insulation circuit 20M. Moreover, the primary-side controller 30 varies an output voltage value and an available output current capacity (MAX value) of the DC/DC converter 13 by controlling the input current of the DC/DC converter 13 on the basis of the control input signal fed back from the insulation circuit 20M.

Moreover, as shown in FIG. 14A, there may be included a control terminal CT, and the control input may be coupled to the control terminal CT. Moreover, a control output signal of the PD device 4 according to the eighth embodiment can be output to an external apparatus through the control terminal CT.

Moreover, the PD device 4 according to the eighth embodiment may include an AC coupling capacitor CC coupled to the control input, and the insulation circuit 20M may be connected to the control input through the AC coupling capacitor CC.

Moreover, the control input may be directly connected to the insulation circuit 20M. More specifically, the control input signal of the control input may be directly input to the insulation circuit 20M without through the AC coupling capacitor CC.

A capacitor, a photo coupler, a transformer, etc. is applicable to the insulation circuit 20M. Moreover, as usage, a bidirectional transformer having an insulated driver, a bilateral device, etc. may also be applied thereto.

Moreover, as shown in FIG. 14A, the secondary-side controller and the error amplifier are removed from the PD device 4 according to the eighth embodiment.

Moreover, as shown in FIG. 14A, the PD device 4 according to the eighth embodiment may include the switch SW connected to the output of the DC/DC converter 13, the switch SW configured to interrupt an output voltage of the DC/DC converter 13. The output of the DC/DC converter 13 and the power line output (VBUS) can be interrupted by the switch SW. ON/OFF control for the switch SW can be executed by the primary-side controller 30 or the insulation circuit 20M. The switch SW may include a MOS switch.

In the PD device 4 according to the eighth embodiment, the control input signal is input into the insulation circuit 20M through the AC coupling capacitor CC from the control input, and then the control information including electric power information at the output side is fed back to the primary-side controller 30 in response to the control input signal. The primary-side controller 30 controls an input current of the DC/DC converter 13 in order to stabilize an output voltage. Other configurations are the same as those of the first embodiment.

Also in the PD device 4 according to the eighth embodiment, the power line output (VBUS)/AC superposition mode may be used in conjunction with the power line output (VBUS)/AC separation mode.

(Modified Example)

Figure 14B:
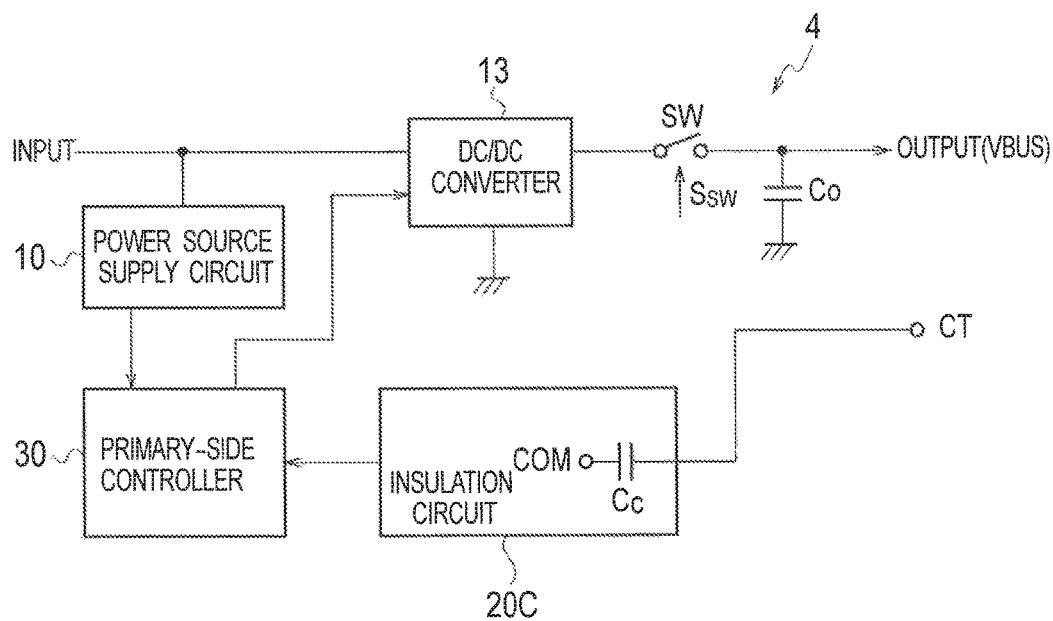
FIG. 14B is a schematic circuit block configuration diagram showing a PD device according to a modified example of the eighth embodiment.

As shown in FIG. 14B, a PD device 4 according to a modified example of the eighth embodiment includes: a DC/DC converter 13 disposed between an input and an output; a primary-side controller 30 configured to control an input current of the DC/DC converter 13; and an insulation circuit 20C connected to the control input and configured to feedback a control input signal of a control input to the primary-side controller 30. In the present embodiment, the control input signal is input into a communication terminal COM provided in the insulation circuit 20C. Moreover, the primary-side controller 30 varies an output voltage value and an available output current capacity (MAX value) of the DC/DC converter 13 by controlling the input current of the DC/DC converter 13 on the basis of the control input signal fed back from the insulation circuit 20C.

Moreover, as shown in FIG. 14B, there may be included a control terminal CT, and the control input may be coupled to the control terminal CT. Moreover, a control output signal of the PD device 4 according to the modified example of the eighth embodiment can be output to an external apparatus through the control terminal CT.

Moreover, the PD device 4 according to the modified example of the eighth embodiment includes an AC coupling capacitor CC coupled to the control input. In this case, the AC coupling capacitor CC is contained in the insulation circuit 20C.

The insulation circuit 20C is connected to the control input through the AC coupling capacitor CC contained therein.

Moreover, as shown in FIG. 14B, the secondary-side controller and the error amplifier are removed from the PD device 4 according to the modified example of the eighth embodiment.

In the PD device 4 according to the modified example of the eighth embodiment, the control input signal is input into the insulation circuit 20C from the control input, and then the control information including electric power information at the output side is fed back to the primary-side controller 30 in response to the control input signal. The primary-side controller 30 controls an input current of the DC/DC converter 13 in order to stabilize an output voltage. Other configurations are the same as those of the eighth embodiment.

Also in the PD device 4 according to the modified example of the eighth embodiment, the power line output (VBUS)/AC superposition mode may be used in conjunction with the power line output (VBUS)/AC separation mode.

According to the eighth embodiment and its modified examples, there can be provided the PD device, in which no filter coil is required for the output side and the mounting space is reduced, and thereby capable of achieving miniaturization and cost reduction, and capable of controlling the output voltage value and the available output current capacity (MAX value).

(MOS Switch)

Figure 15:
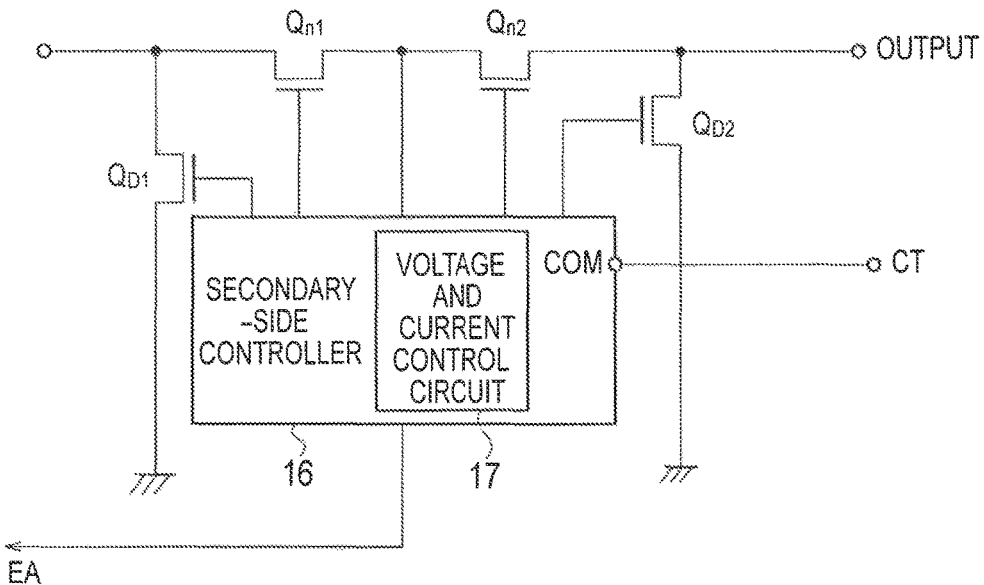
FIG. 15 is a schematic circuit block configuration diagram of a metal oxide semiconductor (MOS) switch applied to the PD device according to the embodiments.

As shown in FIG. 15, a schematic circuit block configuration example of a switch SW applicable to the PD device 4 according to the first or eighth embodiment, or a MOS switch QSW applicable to the PD device according to the second, third, fifth or seventh embodiment includes: two n-channel MOSFETs Qn1, Qn2 connected to each other in series; and MOSFETs QD1, QD2 for discharging respectively connected to both ends of the n channel MOSFETs QD1, QD2 connected to each other in series. Each gate of the two n-channel MOSFETs Qn1, Qn2 connected to each other in series is connected to the secondary-side controller 16, and ON/OFF of MOSFETs QQn1, Qn2 is controlled by the secondary-side controller 16. A voltage and current control circuit 17 is contained in the secondary-side controller 16, and the control input signal is input into the communication terminal COM of the secondary-side controller 16.

(AC Adapter/AC Charger)

The PD device 4 according to the first to eighth embodiments can be contained in AC adapters/AC chargers 3, as shown in FIGS. 16A to 16C, and 17A to 17C.

Figure 16A:
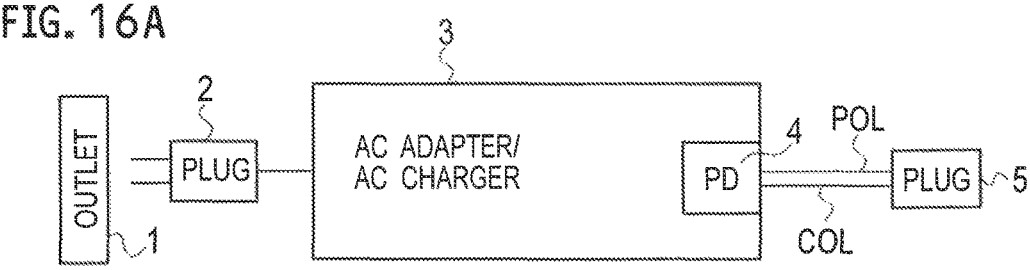
FIG. 16A shows an example of connecting the PD in an AC adapter/AC charger to an external plug, in an example of wire connection for connecting the AC adapter/AC charger to a plug capable of being connected to an outlet using a cable.

As shown in FIG. 16A, the AC adapter/AC charger 3 containing the PD device (PD) 4 according to the embodiments can be connected to the plug 2 connectable to the outlet 1 using a cable, and can be connected to the plug 5 disposed an outside of the AC adapter/AC charger 3. The PD device (PD) 4 and the plug 5 are connected to each other with the power line POL and the communication dedicated line COL. The power line POL and the communication dedicated line COL are directly connected to the PD device (PD) 4.

Figure 16B:
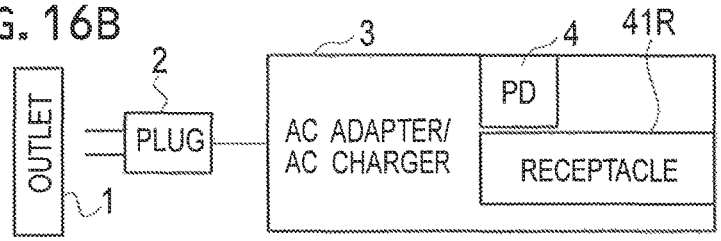
FIG. 16B shows an example of including a receptacle in the AC adapter/AC charger, in the example of wire connection for connecting the AC adapter/AC charger to the plug capable of being connected to the outlet using the cable.

Moreover, as shown in FIG. 16B, the AC adapter/AC charger 3 containing the PD device (PD) 4 according to the embodiments can be connected to the plug 2 connectable to the outlet 1 using a cable, and may also include a receptacle 41R.

Figure 16C:
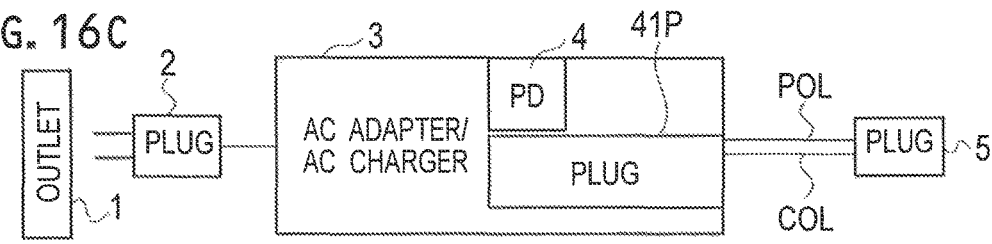
FIG. 16C shows an example of connecting a plug contained in the AC adapter/AC charger to the external plug, in the example of wire connection for connecting the AC adapter/AC charger to the plug capable of being connected to the outlet using the cable.

Moreover, as shown in FIG. 16C, the AC adapter/AC charger 3 containing the PD device (PD) 4 according to the embodiments can be connected to the plug 2 connectable to the outlet 1 using a cable, and may include a plug 41P. The plug 41P can be connected to the plug 5 disposed at the outside thereof. The plug 41P and the plug 5 are connected to each other by the power line POL and the communication dedicated line COL.

Figure 17A:
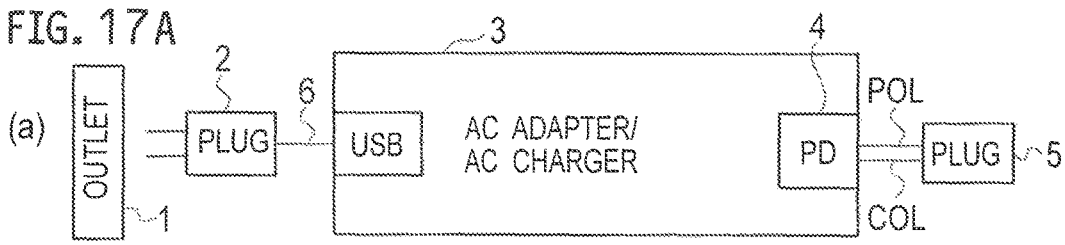
FIG. 17A shows an example of connecting the PD in the AC adapter/AC charger to the external plug, in an example of wire connection for connecting the AC adapter/AC charger to the plug capable of being connected to the outlet using a USB PD cable.

Moreover, as shown in FIG. 17A, the AC adapter/AC charger 3 containing the PD device (PD) 4 according to the embodiments can be connected to the plug 2 connectable to the outlet 1 using a USB PD cable 6, and can also be connected to the plug 5 disposed at the outside of the AC adapter/AC charger 3. The PD device (PD) 4 and the plug 5 are connected to each other with the power line POL and the communication dedicated line COL. The power line POL and the communication dedicated line COL are directly connected to the PD device (PD) 4.

Figure 17B:
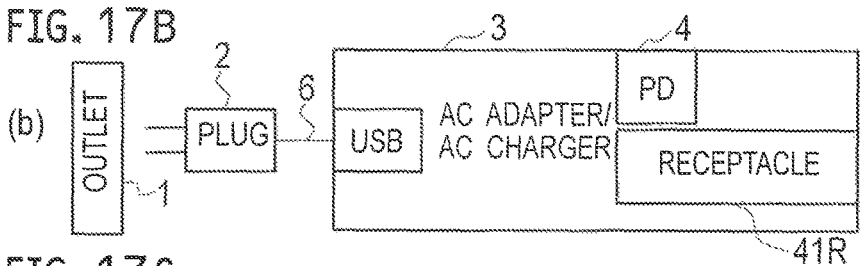
FIG. 17B shows an example of including the receptacle in the AC adapter/AC charger, in the example of wire connection for connecting the AC adapter/AC charger to the plug capable of being connected to the outlet using the USB PD cable.

Moreover, as shown in FIG. 17B, the AC adapter/AC charger 3 containing the PD device (PD) 4 according to the embodiments can be connected to the plug 2 connectable to the outlet 1 using the USB PD cable 6, and may also include a receptacle 41R.

Figure 17C:
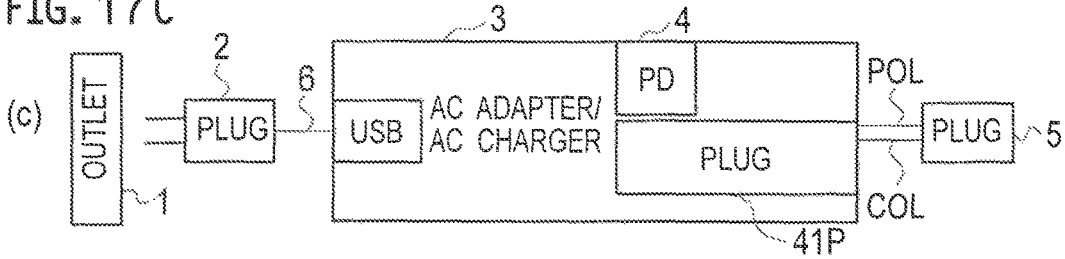
FIG. 17C shows an example of connecting the plug contained in the AC adapter/AC charger to the external plug, in the example of wire connection for connecting the AC adapter/AC charger to the plug capable of being connected to the outlet using the USB PD cable.

Moreover, as shown in FIG. 17C, the AC adapter/AC charger 3 containing the PD device (PD) 4 according to the embodiments may be connected to the plug 2 connectable to the outlet 1 using the USB PD cable 6, and may also include a plug 41P. The plug 41P can be connected to the plug 5 disposed at the outside thereof. The plug 41P and the plug 5 are connected to each other by the power line POL and the communication dedicated line COL.

Figure 18A:
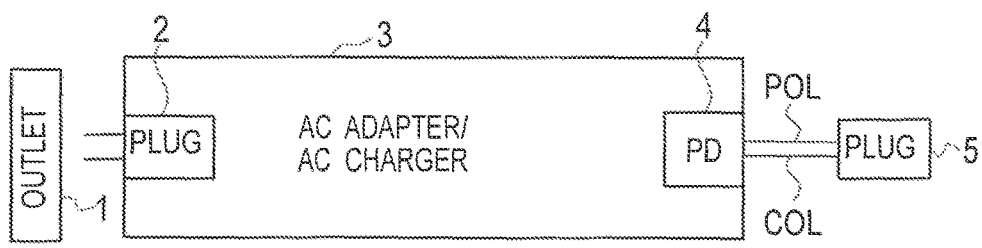
FIG. 18A shows an example of connecting the PD in the AC adapter/AC charger to the external plug, in an example of containing the plug capable of being connected to the outlet in the AC adapter/AC charger.
Figure 18B:
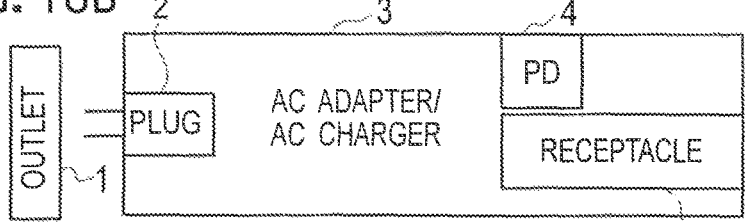
FIG. 18B shows an example of including the receptacle in the AC adapter/AC charger, in the example of containing the plug capable of being connected to the outlet in the AC adapter/AC charger.
Figure 18C:
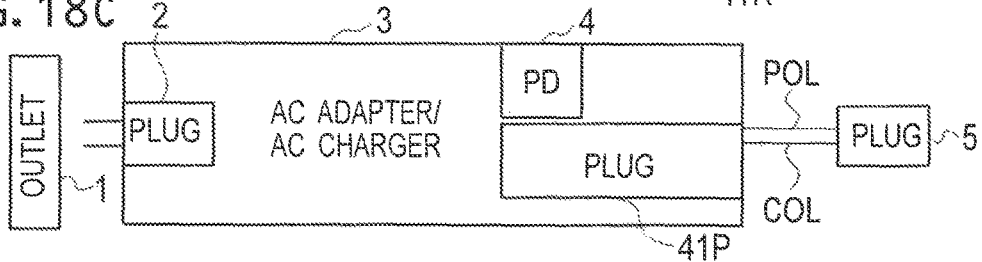
FIG. 18C shows an example of connecting the plug contained in the AC adapter/AC charger to the external plugs, in the example of containing the plug capable of being connected to the outlet in the AC adapter/AC charger.

Moreover, the plug 2 connectable to the outlet 1 may be contained in the AC adapter 3 including the PD device (PD) 4 according to the embodiments, as shown in FIGS. 18A to 18C.

As shown in FIG. 18A, the AC adapter/AC charger 3 containing the PD device (PD) 4 according to the embodiments and the plug 2 can be connected to the plug 5 disposed at the outside thereof. The PD device (PD) 4 and the plug 5 are connected to each other with the power line POL and the communication dedicated line COL. The power line POL and the communication dedicated line COL are directly connected to the PD device (PD) 4.

Moreover, the AC adapter/AC charger 3 containing the PD device (PD) 4 according to the embodiments and the plug 2 may include the receptacle 41R, as shown in FIG. 18B.

Moreover, the AC adapter/AC charger 3 containing the PD device (PD) 4 according to the embodiments and the plug 2 may include the plug 41P, as shown in FIG. 18C. The plug 41P can be connected to the plug 5 disposed at the outside thereof. The plug 41P and the plug 5 are connected to each other by the power line POL and the communication dedicated line COL.

Figure 19A:
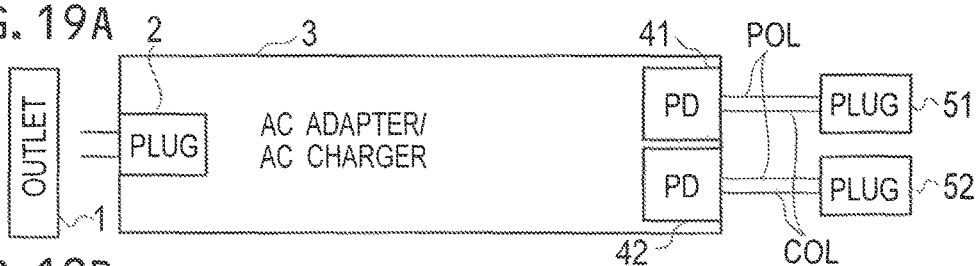
FIG. 19A shows an example of respectively connecting a plurality of the PDs in the AC adapter/AC charger to a plurality of the external plugs, in an example of containing the plug capable of being connected to the outlet in the AC adapter/AC charger.
Figure 19B:
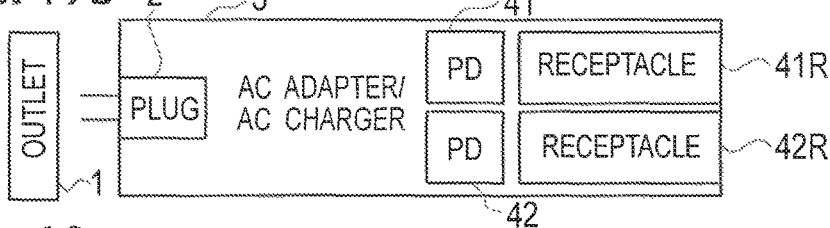
FIG. 19B shows an example of including a plurality of the receptacles in the AC adapter/AC charger, in the example of containing the plug capable of being connected to the outlet in the AC adapter/AC charger.
Figure 19C:
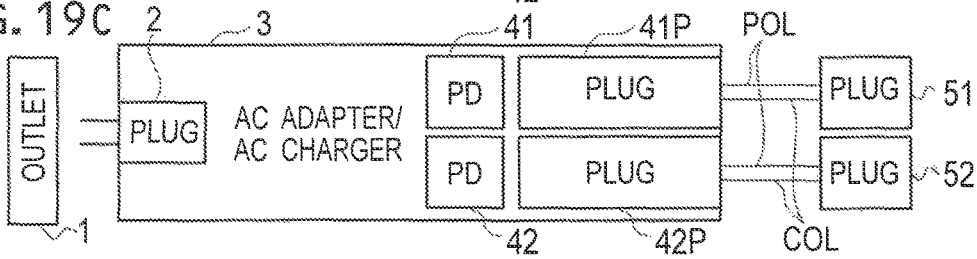
FIG. 19C shows an example of respectively connecting a plurality of the plugs contained in the AC adapter/AC charger to a plurality of the external plugs, in the example of containing the plug capable of being connected to the outlet in the AC adapter/AC charger.

A plurality of the PD devices according to the embodiments can be contained in the AC adapter/AC charger 3, as shown in FIGS. 19A to 19C. Moreover, the plug 2 connectable to the outlet 1 is also contained therein.

As shown in FIG. 19A, the AC adapter/AC charger 3 containing a plurality of the PD devices (PD) 41, 42 according to the embodiments and the plug 2 can be respectively connected to a plurality of the plugs 51, 52 disposed at the outside thereof. The PD devices (PD) 41, 42 and the plugs 51, 52 are respectively connected to each other with the power line POL and the communication dedicated line COL. The power line POL and the communication dedicated line COL are directly connected to the PD devices (PD) 41, 42.

Moreover, the AC adapter/AC charger 3 containing the plurality of the PD devices (PD) 41, 42 according to the embodiments and the plug 2 may include receptacles 41R, 42R, as shown in FIG. 19B.

Moreover, the AC adapter/AC charger 3 containing the plurality of the PD devices (PD) 41, 42 according to the embodiments and the plug 2 may include plugs 41P, 42P, as shown in FIG. 19C. The plugs 41P, 42P can be respectively connected to the plugs 51, 52 disposed at the outside thereof. The plugs 41P, 42P and the plugs 51, 52 are respectively connected to each other by the power line POL and the communication dedicated line COL.

(Electronic Apparatus)

As shown in FIGS. 20 to 21, the PD device according to the first to eighth embodiments can be contained in an electronic apparatus 7. As an electronic apparatus, there are applicable various apparatus, e.g. monitors, external hard disk drives, set top boxes, laptop PCs, tablet PCs, smartphones, battery charger systems, personal computers (PCs), displays, printers, cleaners, refrigerators, facsimiles, telephones, car navigation systems, car computers, television sets, spectacles, head-mounted displays, fans, air-conditioners, laser displays, or wall outlets, for example.

Figure 20A:
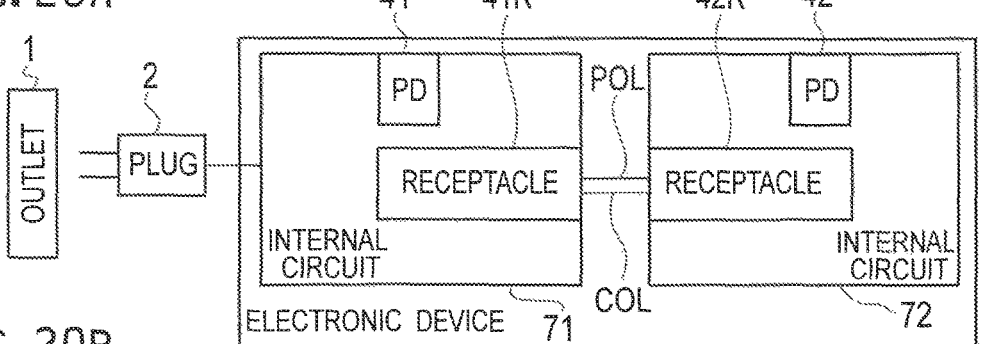
FIG. 20A shows in particular an example of including a plurality of internal circuits containing the receptacle therein in an electronic apparatus, in an example of wire connection for connecting the electronic apparatus to the plug capable of being connected to the outlet using the cable.

FIG. 20A shows an example of including internal circuits 71, 72 respectively containing the PD devices 41, 42 and the receptacles 41R, 42R in electronic apparatus 7, in an example of wire connection for connecting the electronic apparatus 7 to the plug 2 capable of being connected to the outlet 1 using a cable.

Figure 20B:
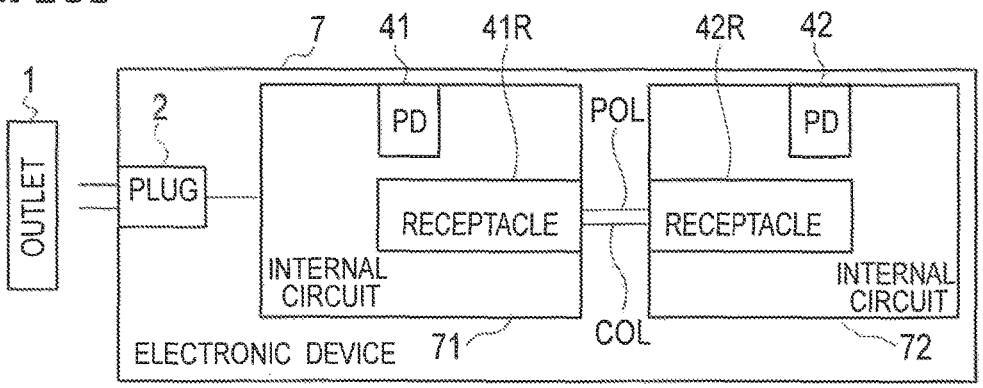
FIG. 20B shows in particular an example of containing the plug connectable to the outlet in the electronic apparatus and including a plurality of internal circuits containing the receptacle therein in the electronic apparatus, in an example of wire connection for connecting the electronic apparatus to the plug capable of being connected to the outlet using the cable.

Moreover, FIG. 20B shows an example of containing the plug 2 connectable to the outlet 1 in the electronic apparatus 7, and also including internal circuits 71, 72 respectively containing the PD devices 41, 42 and the receptacles 41R, 42R in the electronic apparatus 7.

In FIGS. 20A and 20B, the receptacles 41R and 42R are connected to each other by the power line POL and the communication dedicated line COL.

Figure 21A:
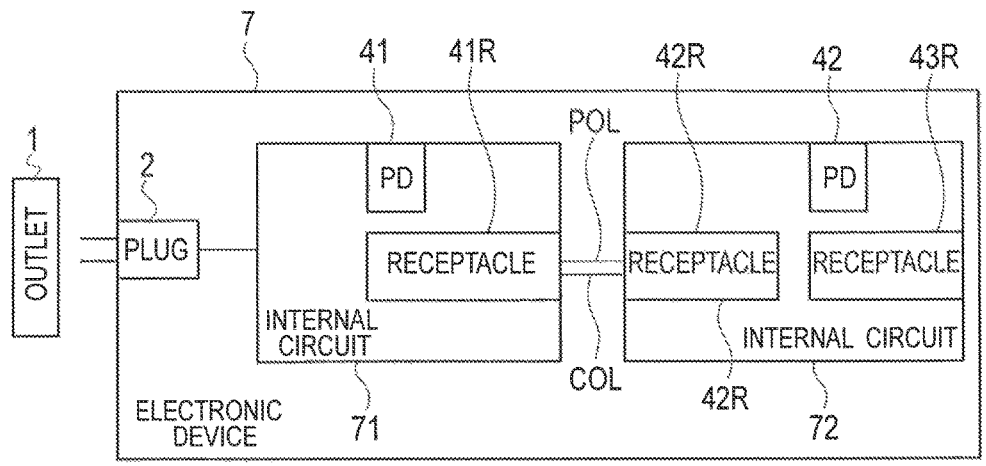
FIG. 21A shows in particular an example of including the receptacle connected to the outside in one internal circuit, in an example in which the plug capable of being connected to the outlet is included in the electronic apparatus, and the plurality of the internal circuits containing the receptacle therein are included in the electronic apparatus.

FIG. 21A shows an example of including the receptacle 43R connected to the outside thereof in one internal circuit 72, in an example of containing the plug 2 connectable to the outlet 1 in the electronic apparatus 7, and also including internal circuits 71, 72 respectively containing the PD devices 41, 42 and the receptacles 41R, 42R in the electronic apparatus 7.

Figure 21B:
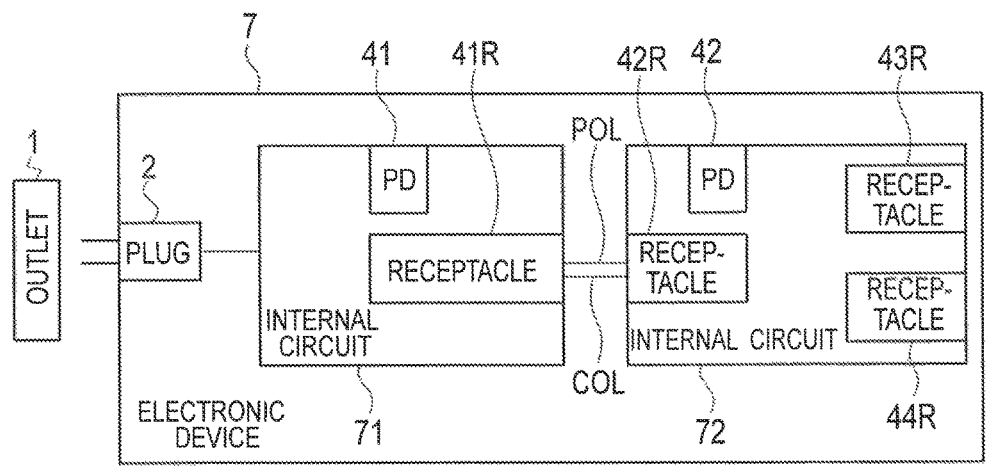
FIG. 21B shows in particular an example of including a plurality of the receptacles connected to the outside in one internal circuit, in an example in which the plug capable of being connected to the outlet is included in the electronic apparatus, and the plurality of the internal circuits containing the receptacle therein are included in the electronic apparatus.

Moreover, FIG. 21B shows an example of including a plurality of the receptacles 43R, 44R connected to the outside thereof in one internal circuit 72, in an example of containing the plug 2 connectable to the outlet 1 in the electronic apparatus 7, and also including internal circuits 71, 72 respectively containing the PD devices 41, 42 and the receptacles 41R, 42R in the electronic apparatus 7.

Also in FIGS. 21A and 21B, the receptacles 41R and 42R can be connected to each other by the power line POL and the communication dedicated line COL.

(Protection Function)

Figure 22A:
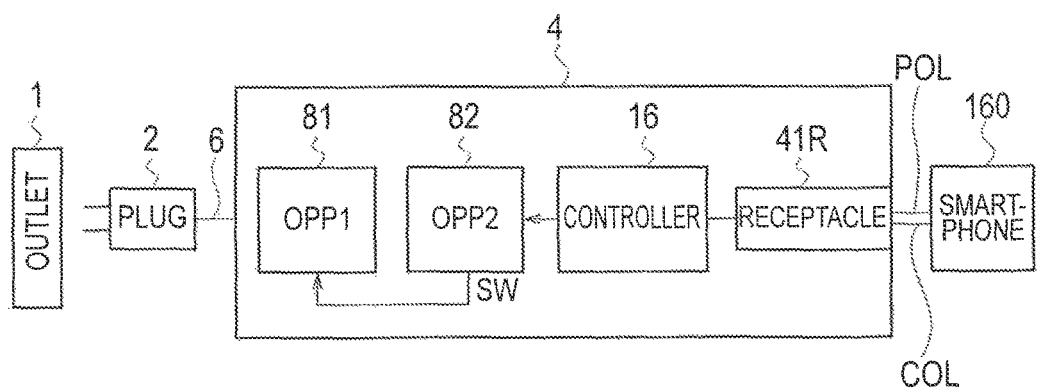
FIG. 22A is an explanatory diagram of a protection function of the USB PD device according to the embodiments in the case where a smart phone is used as a connecting target.
Figure 22B:
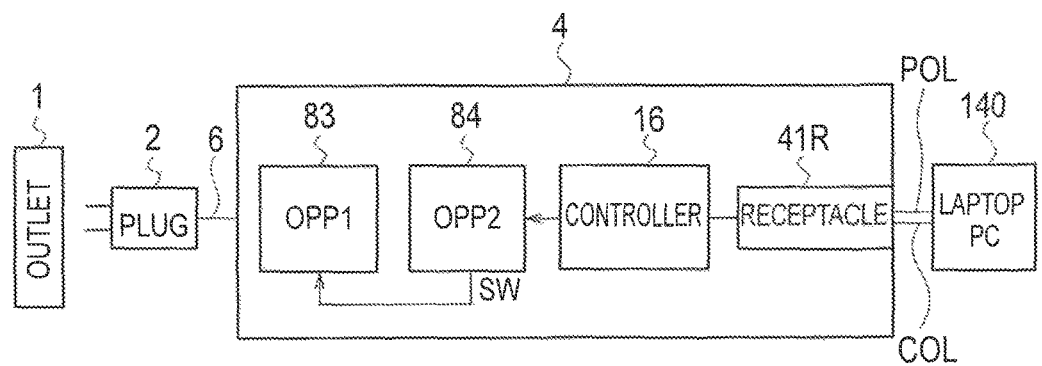
FIG. 22B is an explanatory diagram of a protection function of the USB PD device according to the embodiments in the case where a laptop PC is used as a connecting target.

FIG. 22A shows an explanatory diagram of a protection function for the PD device 4 according to the embodiments in a case of using a smartphone 160 as a connecting target, and FIG. 22B shows an explanatory diagram of the protection function for the PD device 4 according to the embodiments in a case of using a laptop PC 140 as a connecting target.

As shown in FIGS. 22A and 22B, the PD device 4 according to the embodiments may include: a primary-side overpower Protecting circuit (OPP1) (81, 83); and a secondary-side overpower Protecting circuit (OPP2) (82, 83) connected to the primary-side overpower protecting circuit (OPP1) (81, 83). The primary-side overpower protecting circuit (OPP1) (81, 83) is connected to a primary-side controller (not shown). Moreover, the primary-side overpower protecting circuit (OPP1) (81, 83) may be contained in the primary-side controller. The secondary-side overpower protecting circuit (OPP2) (82, 84) is connected to the secondary-side controller 16.

In accordance with target equipment (target sets) connected to the receptacle 41R, electric power information and communication control information in the receptacle 41R are transmitted to the secondary-side overpower protecting circuit (OPP2) (82, 84) from the secondary-side controller 16, and then the secondary-side overpower protecting circuit (OPP2) (82, 84) transmits the aforementioned electric power information and communication control information to the primary-side overpower protecting circuit (OPP1) (81, 83). Consequently, an overcurrent detecting set value can be changed in accordance with the target equipment (target sets) connected to the receptacle 41R, thereby executing power change of the DC/DC converter 13.

Any of the primary-side overpower protecting circuit (OPP1) 81 and the secondary-side overpower protecting circuit (OPP2) 82 may determine whether the electric power information and communication control information in the receptacle 41R exceeds the overcurrent detecting set value.

If it is determined that the electric power information and communication control information in the receptacle 41R exceed the overcurrent (overpower) detecting set value, the primary-side overpower protecting circuit (OPP1) (81, 83) transmits an overcurrent (overpower) protecting control signal to the primary-side controller (not shown), thereby executing the change for controlling the electric power in the DC/DC converter 13.

Various functions, e.g. Over Current Protection (OCP), Over Power Protection (OPP), Over Voltage Protection (OVP), Over Load Protection (OLP), and Thermal Shut Down (TSD), are applicable to the PD device 4 according to the embodiments.

The PD device 4 according to the embodiments includes a sensor (SENSOR) protection function for executing protection corresponding to the characteristics of a certain sensor element connected to the primary-side controller (not shown), for example.

When the overcurrent (overpower) detecting set value is changed in the PD device 4 according to the embodiments, the electric power information and communication control information in the receptacle 41R are transmitted to the primary-side overpower protecting circuit (OPP1) (81, 83) through the secondary-side controller 16 and the secondary-side overpower protecting circuit (OPP2) (82, 84), as mentioned above. Consequently, an overcurrent detecting set value can be changed in accordance with the target equipment (target sets) connected to the receptacle 41R, thereby executing power change of the DC/DC converter 13.

Moreover, when the overcurrent (overpower) detecting set value is changed in the PD device 4 according to the embodiments, the electric power information and communication control information in the receptacle 41R may be directly transmitted to the primary-side overpower protecting circuit (OPP1) (81, 83) from the secondary-side controller 16, thereby directly changing the set value in the primary-side overpower protecting circuit (OPP1) (81, 83).

Moreover, the electric power information may be directly transmitted to the primary-side overpower protecting circuit (OPP1) (81, 83) from the outside of the PD device 4 according to the embodiments.

Thus, according to the PD device 4 according to the embodiments, it is possible to change the PD level in accordance with the target equipment (target sets) connected to the receptacle 41R, in the primary-side overpower protecting circuit (OPP1) (81, 83). Consequently, a destruction of the target equipment (target sets) can be prevented under an abnormal state.

When using a smart phone 160 as a connecting target, with respect to the smart phone 160 (the amount of power 5V·1 A=5 W), if the electric power information and communication control information of 7 W is transmitted to the secondary-side overpower protecting circuit (OPP2) 82 from the secondary-side controller 16, for example, the electric power information and communication control information of 7 W is transmitted to the primary-side overpower protecting circuit (OPP1) 81 from the secondary-side overpower protecting circuit (OPP2) 82, and then the overcurrent (overpower) detecting set value is changed (SW) from 7 W up to 10 W in the primary-side overpower protecting circuit (OPP1) 81. Consequently, the electric power up to 10 W can be transmitted, in the DC/DC converter in the PD device 4 according to the embodiments.

When using a laptop PC 140 as a connecting target, with respect to the laptop PC 140 (the amount of power 20V·3 A=60 W), if the electric power information and communication control information of 80 W is transmitted to the secondary-side overpower protecting circuit (OPP2) 84 from the secondary-side controller 16, for example, the electric power information and communication control information of 80 W is transmitted to the primary-side overpower protecting circuit (OPP1) 83 from the secondary-side overpower protecting circuit (OPP2) 84, and then the overcurrent (overpower) detecting set value is changed (SW) from 80 W up to 100 W in the primary-side overpower protecting circuit (OPP1) 83. Consequently, the electric power up to 100 W can be transmitted, in the DC/DC converter in the PD device 4 according to the embodiments.

(Receptacle/Plug)

Figure 23:
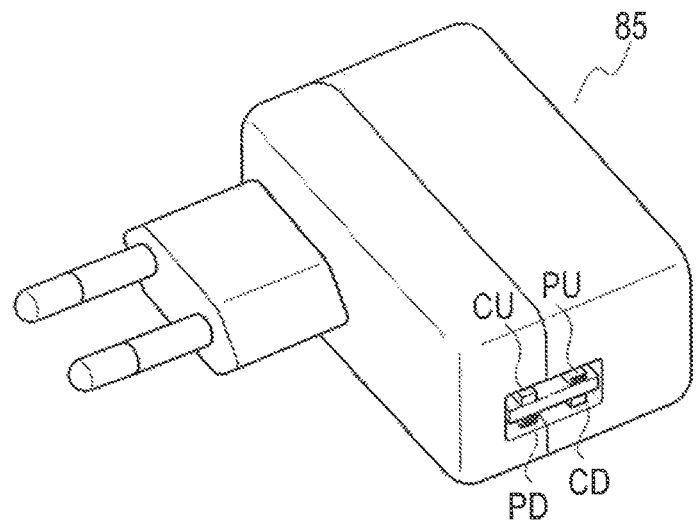
FIG. 23 shows a schematic bird's-eye view structure example of a PD device, in which a receptacle is mounted, according to the embodiments, applicable to the AC adapter, the AC charger, and the electronic apparatus.
Figure 26:
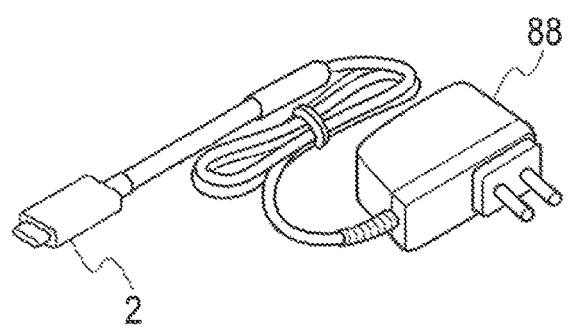
FIG. 26 shows a schematic bird's-eye view structure example of a PD device, in which a plug is mounted, according to the embodiments, applicable to the AC adapter, the AC charger, and the electronic apparatus.

As shown in FIG. 23, the PD device 85 according to the embodiments applicable to the AC adapter, the AC charger, and the electronic apparatus in which the receptacle is mounted can be connected an outlet having AC power sources 100V-115V, and a plug connected to the power line POL and the communication dedicated line COL can be inserted thereinto. An example of plug structure is shown in FIG. 26

The power line POL can be connected to any of an upper-side power terminal PU and a lower-side power terminal PD of the receptacle, and the communication dedicated line COL can be connected to any of an upper-side communication terminal CU and a lower-side communication terminal CD of the receptacle. The electric power information can be transmitted through the power line POL, and the communication control information can be transmitted through the communication dedicated line COL. As shown in FIG. 23, The receptacle 85 applicable to the AC adapter, the AC charger, and the electronic apparatus in which the PD device according to the embodiments is mounted can be connected to any of the power terminals PU, PD and the communication terminals CU, CD, and there is no need to select the upper or lower side (front or back two surfaces) of the corresponding plug, and therefore convenience in use is effective.

Figure 24:
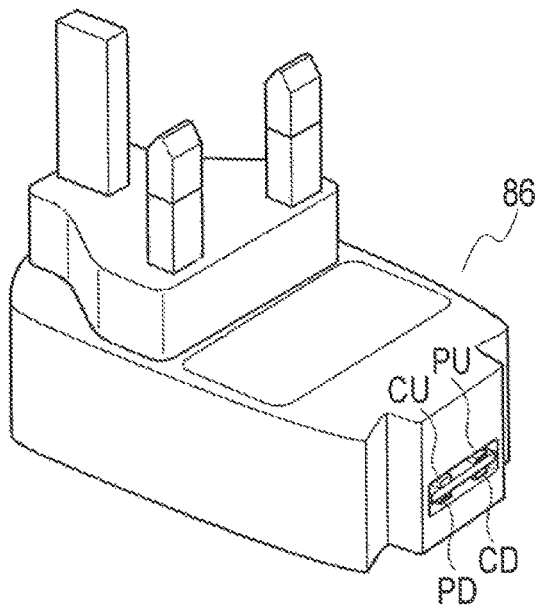
FIG. 24 shows a schematic bird's-eye view structure example of a PD device, in which a receptacle is mounted, according to the embodiments, applicable to the AC adapter, the AC charger, and the electronic apparatus.

Moreover, as shown in FIG. 24, the PD device 86 according to the embodiments applicable to the AC adapter, the AC charger, and the electronic apparatus in which the receptacle is mounted can be connected an outlet having AC power sources 230V, and a plug connected to the power line POL and the communication dedicated line COL can be inserted thereinto. An example of plug structure is shown in FIG. 26.

Figure 25:
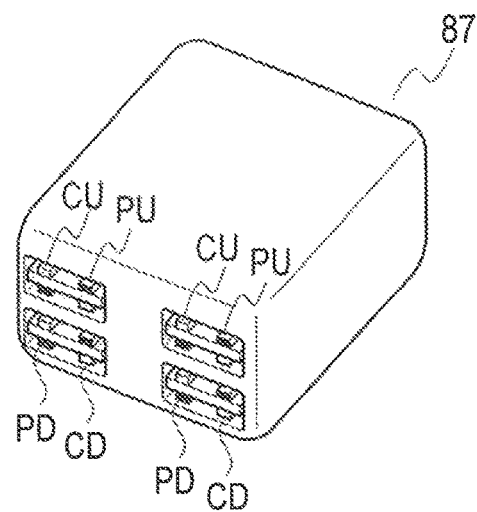
FIG. 25 shows a schematic bird's-eye view structure example of a PD device, in which a plurality of receptacles are mounted, according to the embodiments, applicable to the AC adapter, the AC charger, and the electronic apparatus.

Moreover, as shown in FIG. 25, the PD device 87 according to the embodiments applicable to the AC adapter, the AC charger, and the electronic apparatus in which the receptacle is mounted can be connected an outlet having AC power sources 100V-115V, and a plurality of plugs connected to the power line POL and the communication dedicated line COL can be inserted thereinto. An example of plug structure is shown in FIG. 26.

Moreover, as shown in FIG. 26, the PD device 88 according to the embodiments applicable to the AC adapter, the AC charger, and the electronic apparatus in which the plug 2 is mounted can be connected an outlet having AC power sources 100V-115V, and an outlet having AC power sources 230V. The plug 2 is synonymous with configurations shown in FIGS. 16A and 16C, 17A and 17C, 18A and 18C, and 19A and 19C. Moreover, the plug 2 may be applicable also to the USB PD. Accordingly, in FIG. 26, the plug 2 can be called as an advanced USB plug.

A plug for an ordinary USB has an electrode at one side, and has VBUS, D+, D−, and GND terminals. A plug for the USB PD has VBUS, D+, D−, and GND terminals having an electrode at one side thereof (its shape is the same as that of USB.).

In the embodiments, the above-mentioned advanced USB plug 2 has VBUS, D+, D−, CU or CD, and GND terminals having electrodes in both sides and do not have difference in the back and front. The CU or CD terminal is connected to the communication dedicated line COL used for two-way communications between apparatuses. The advanced USB plug 2 is inserted in the advanced USB receptacle in order to realize the power supply and data communications. Accordingly, the plug 2 can be called as an advanced USB plug, and the receptacle can be called as an advanced USB receptacle.

(PD System)

In the PD system to which the PD device according to the embodiments can be applied, a source of electric power can be switched without changing a direction of the cable. For example, electric charging of a battery in a laptop PC from external devices and power transmission from the battery in the laptop PC to external devices (e.g., display etc.) can be achieved without replacement of the cable.

Moreover, power transmission and half-duplex data communications can be realized between two units through the power line POL and the communication dedicated line COL.

In the PD system to which the PD device according to the embodiments can be applied, DC power delivery (DC PD) (DC output VBUS) and data communications can be transmitted between the battery charger system and the laptop PC by using the power line POL and the communication dedicated line COL. In this case, the PD device according to the embodiments is mounted in the battery charger system and the laptop PC.

In the PD system to which the PD device according to the embodiments can be applied, DC PD (DC output VBUS) and data communications can be transmitted also between the smartphone and the laptop PC by using the power line POL and the communication dedicated line COL. In this case, the PD device according to the embodiments is mounted in the smartphone and the laptop PC.

Figure 27:
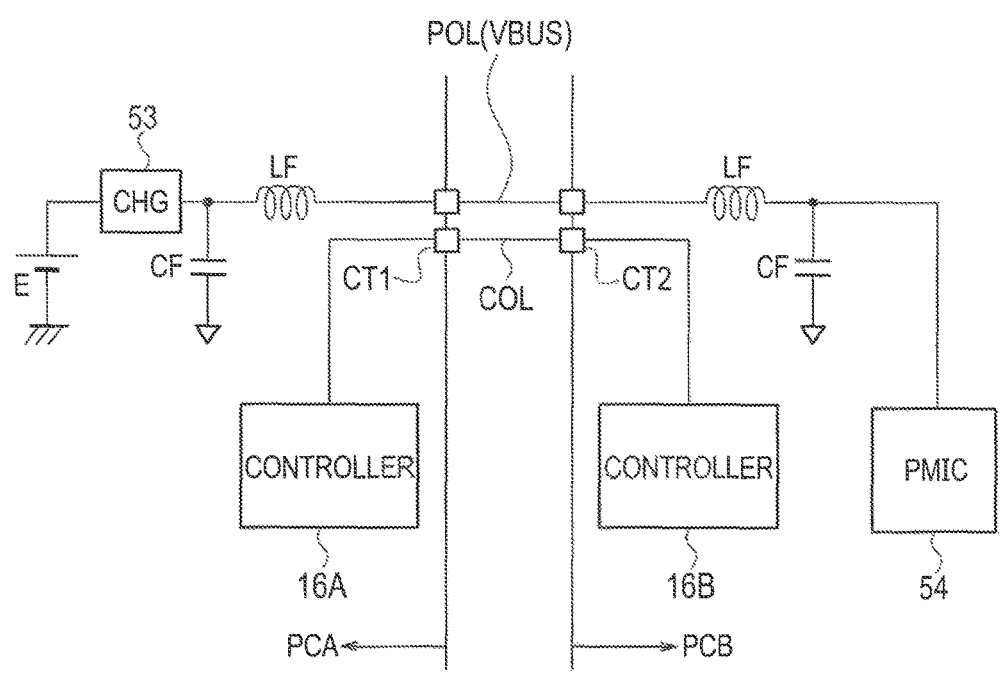
FIG. 27 is a schematic block configuration diagram for explaining the data communications and the PD between two PCs, in the PD system to which the PD device according to the embodiments can be applied.

FIG. 27 shows a schematic block configuration for explaining the data communications and the electric power supply between two personal computers (PCs) PCA, PCB, in the PD system to which the PD device according to the embodiments can be applied. In FIG. 27, illustration of the DC/DC converters are omitted, but the secondary-side controllers 16A, 16B, are shown. The PD devices according to the embodiments are respectively mounted in the personal computers (PCs) PCA, PCB.

The personal computers (PC) PCA, PCB are connected to each other through the power line POL and the communication dedicated line COL. The communication dedicated line COL is connected between the control terminals CT1, CT2.

As shown in FIG. 27, the control terminal CT1 is connected to the controller 16A, and the control terminal CT2 is connected to the controller 16B. The secondary-side controllers 16A, 16B and the control terminals CT1, CT2 may be respectively connected each other through the AC coupling capacitor CC. Moreover, a battery E and a battery charger IC (CHG) 53 connected to the battery E is mounted in the personal computer (PC) PCA, and a Power Management IC (PMIC) 54 is mounted in the personal computer (PC) PCB. In addition, the inductances LF, CF configuring the filter circuit can be respectively omitted.

In the PD system to which the PD device according to the embodiments can be applied, electric charging of the battery E from the personal computer PCB to the personal computer PCA, and power transmission of the battery E from the personal computer PCA to the personal computer PCB can achieved without replacement of any cable, for example.

Moreover, the secondary-side controllers 16A, 16B are respectively connected to the communication dedicated lines COL, thereby realizing half-duplex data communications between the personal computers (PCs) PCA, PCB. In the present embodiment, the carrier frequency is approximately 23.2 MHz, for example, and the FSK modulation/demodulation frequency is approximately 300 kbps, for example. In the present embodiment, the Bit Error Rate (BER) is approximately $1 \times 10-6$, and an LSI for built-in self tests (BIST) may be included therein, for example.

Figure 28:
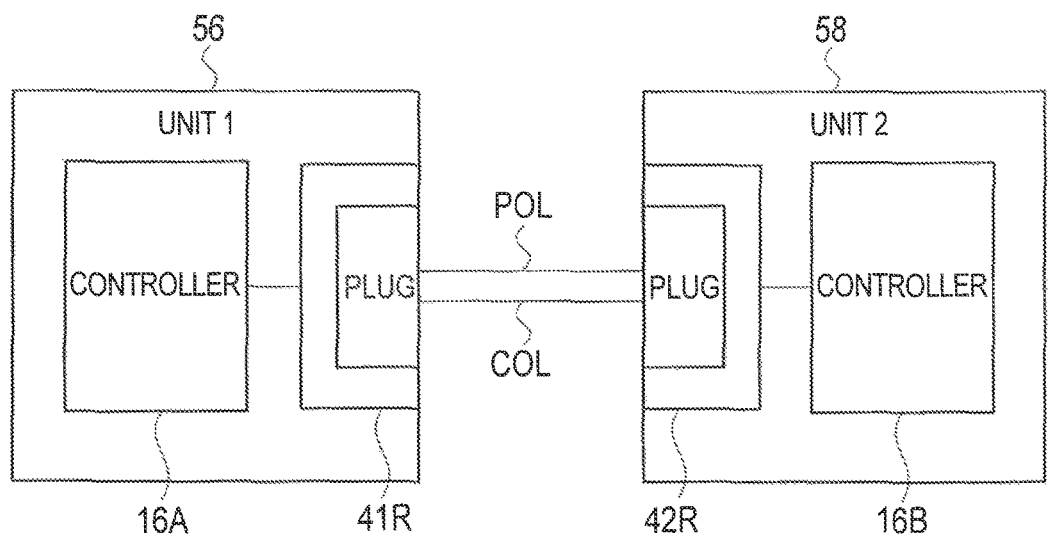
FIG. 28 is a schematic block configuration diagram for explaining the data communications and the PD between two units, in the PD system to which the PD device according to the embodiments can be applied.

FIG. 28 shows a schematic block configuration for explaining the data communications and the electric power supply between two units 56, 58, in the PD system to which the PD device according to the embodiments can be applied.

The two units 56, 58 are connected to each other by the power line POL and the communication dedicated line COL. The power line POL and the communication dedicated line COL is plug-connected to the receptacles 41R, 42R contained in the two units 56, 58.

The two units 56, 58 are arbitrary electronic apparatuses in which the PD devices according to the embodiments are respectively mounted. In FIG. 28, illustration of the DC/DC converters are omitted, but the secondary-side controllers 16A, 16B, are shown. Illustration of the AC coupling capacitor CC is also omitted.

Figure 29:
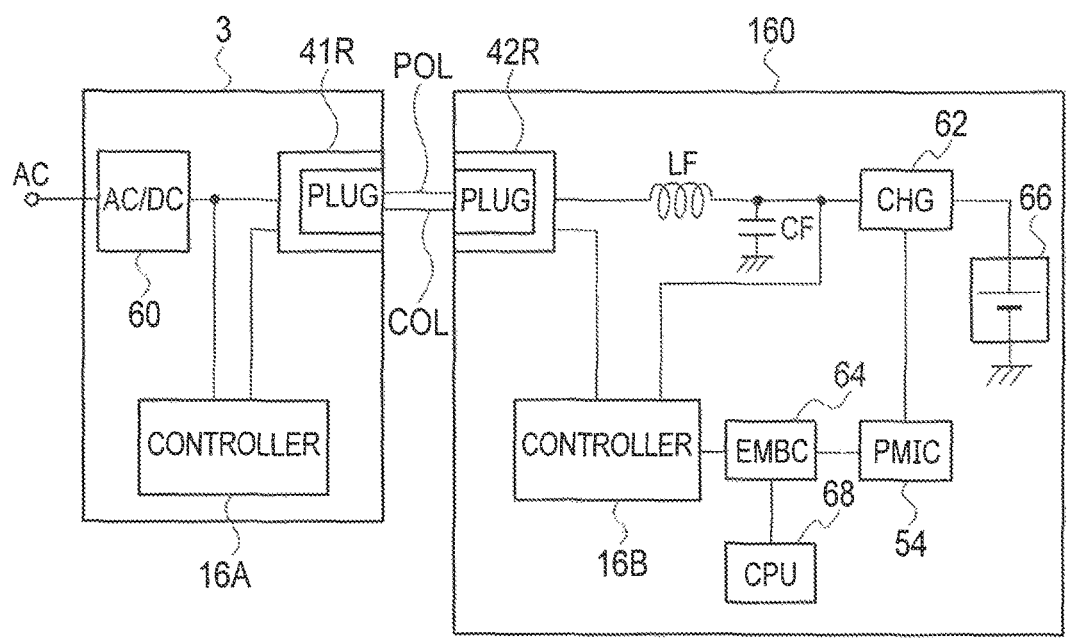
FIG. 29 is a schematic block configuration diagram showing a PD system including an AC adapter/AC charger and a smartphone each containing the PD device according to the embodiments.

FIG. 29 shows a schematic block configuration of a PD system including an AC adapter/AC charger 3 and a smartphone 160 each which contains the PD device according to the embodiments.

The AC adapter/AC charger 3 and the smartphone 160 are connected to each other by the power line POL and the communication dedicated line COL. The power line POL and the communication dedicated line COL are plug-connected to the receptacles 41R, 42R respectively contained in the AC adapter/AC charger 3 and the smartphone 160.

The PD devices according to the embodiments are respectively mounted in the AC adapter/AC charger 3 and the smartphone 160. In FIG. 29, illustration of the DC/DC converters are omitted, but the secondary-side controllers 16A, 16B, are shown.

The AC adapter/AC charger 3 includes the AC/DC converter 60, and the secondary-side controller 16A. The smartphone 160 includes the secondary-side controller 16B, an embedded type controller (EMBC) 64, a CPU 68, a PMIC 54, a battery 66, and a battery charger IC (CHG) 62. The AC coupling capacitors CC may be respectively provided between the secondary-side controllers 16A, 16B and the receptacles 41R, 42R. In addition, the inductances LF, CF configuring the filter circuit can be respectively omitted.

In the PD system to which the PD device according to the embodiments can be applied, electric charging of the battery 66 in the smart phone 160 from the AC adapter/AC charger 3, and power transmission to the external device from the battery 66 in the smart phone 160 can be achieved without replacement of the cable, for example.

Figure 30:
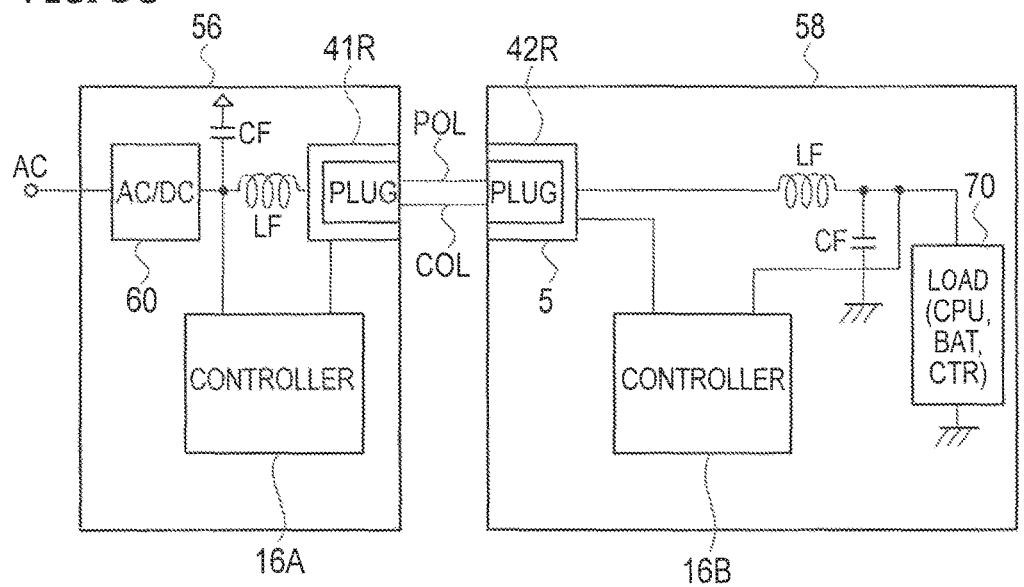
FIG. 30 is a schematic block configuration diagram of a PD system including two units each containing the PD device according to the embodiments.

FIG. 30 shows a schematic block configuration of a PD system including two units 56, 58 each containing the PD device according to the embodiments.

The two units 56, 58 are connected to each other by the power line POL and the communication dedicated line COL. The power line POL and the communication dedicated line COL is plug-connected to the receptacles 41R, 42R contained in the two units 56, 58.

The PD devices according to the embodiments are respectively mounted in the two units 56, 58. In FIG. 30, illustration of the DC/DC converters are omitted, but the secondary-side controllers 16A, 16B, are shown.

The unit 56 includes the AC/DC converter 60 and the secondary-side controller 16A, and the unit 58 includes the secondary-side controller 16B and a load 70. The AC coupling capacitors CC may be respectively provided between the secondary-side controllers 16A, 16B and the receptacles 41R, 42R. In the present embodiment, the load 70 can be composed of a CPU, a battery BAT, a controller CTR, etc. In addition, the inductances LF, CF configuring the filter circuit can be respectively omitted.

In the PD system to which the PD device according to the embodiments can be applied, power transmission from the unit 56 to the unit 58, and power transmission to external devices from the unit 58 can be achieved without replacement of the cable, for example.

Moreover, the secondary-side controllers 16A, 16B are respectively connected to the communication dedicated lines COL, thereby realizing half-duplex data communications between the units 56, 58.

Figure 31:
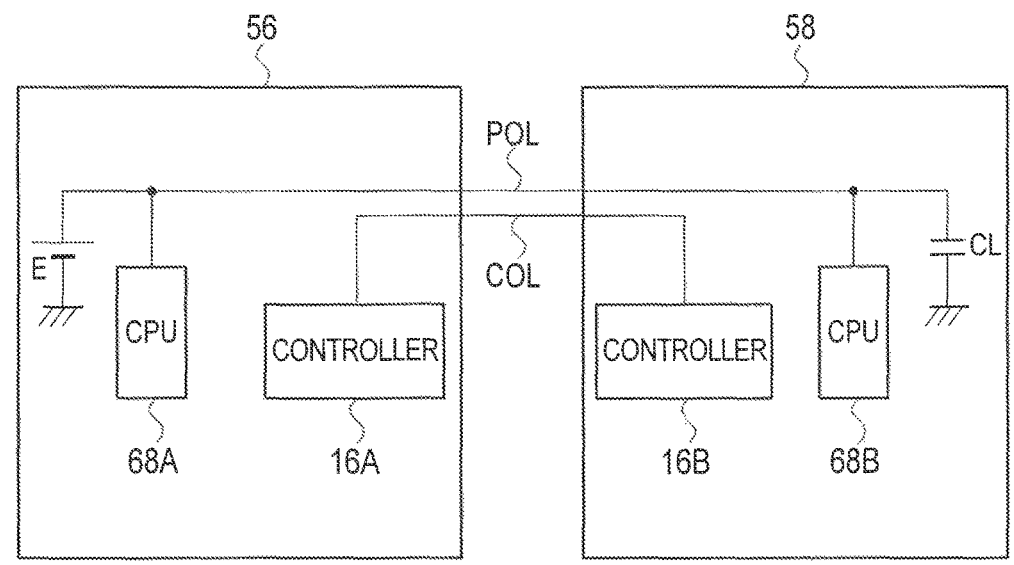
FIG. 31 is a schematic block configuration diagram showing a PD system to which the PD device according to the embodiments can be applied, including other two units.

In the PD system to which the PD device according to the embodiments can be applied, FIG. 31 shows a schematic block configuration composed of two units 56, 58 different from the configuration shown in FIG. 30.

The unit 56 includes a battery E-CPU68A and the secondary-side controller 16A. The unit 58 includes a CPU 68B, the secondary-side controller 16B, and a load CL.

The two units 56, 58 are connected to each other by the power line POL and the communication dedicated line COL. The power line POL and the communication dedicated line COL is plug-connected to the receptacles 41R, 42R (not shown) contained in the two units 56, 58. The power line POL is connected between the battery E and the load CL, and the communication dedicated line COL is connected between the secondary-side controllers 16A, 16B. The secondary-side controllers 16A, 16B and the communication dedicated line COL may be respectively connected each other through the AC coupling capacitor CC.

In the PD system to which the PD device according to the embodiments can be applied, power transmission from the unit 58 to the unit 56, and power transmission to the unit 58 from the battery E can be achieved without replacement of the cable, for example. Moreover, the half-duplex data communications, for example, can be realized between the units 56, 58.

Figure 32:
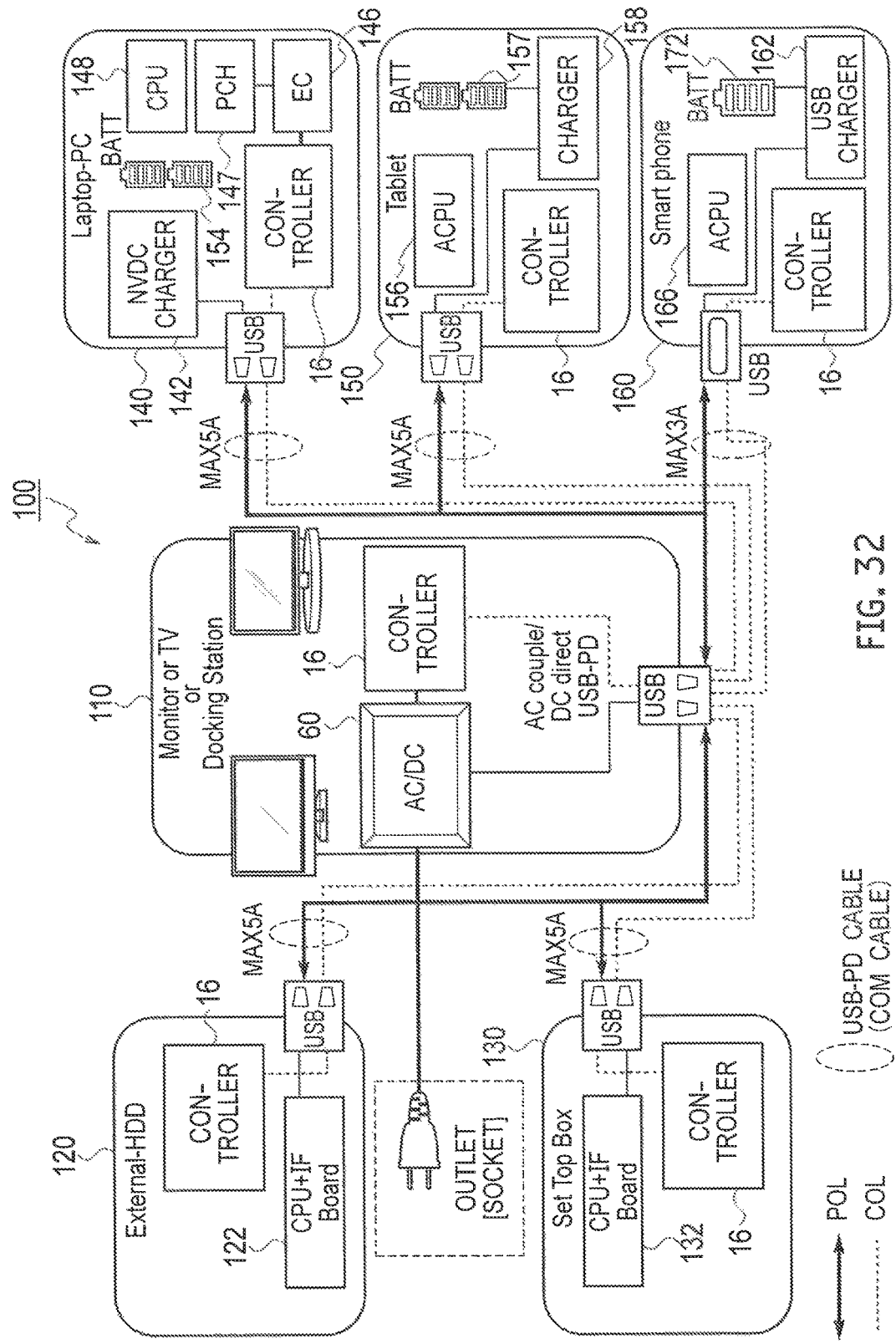
FIG. 32 is a schematic block configuration diagram showing a first PD system to which the PD device according to the embodiments can be applied.

As shown in FIG. 32, a first PD system 100 to which the PD device according to the embodiments can be globally applied includes: a monitor 110 connected to an outlet through a plug; and An external hard disk drive 120, a set top box 130, a laptop PC 140, a tablet PC 150, and a smart phone 160 each connected to the monitor 110. In the present embodiments, otherwise, the monitors 110 may be TV or a docking station.

Although the PD device 4 according to the embodiments is mounted in each configuring elements, illustration of the DC/DC converter is omitted, but the controller 16 is illustrated in FIG. 32. Moreover, the AC coupling capacitor CC may be applied to the communication dedicated line COL. Moreover, when applying the USB PD, a USB PD controller may be applied to the controller 16.

Power transmission and communications data transmission can be executed using the power line POL and the communication dedicated line COL, between the monitor 110, and the external hard disk drive 120, the set top box 130, the laptop PC 140, the tablet PC 150 and the smartphone 160. The power line POL is illustrated with the thick solid line, and the communication dedicated line COL is illustrated with the dashed line. When applying the USB PD, the power line POL may be used therefor, instead of the communication dedicated line COL illustrated with the dashed line. Moreover, the communication dedicated line COL is connected to the controller 16 through the AC coupling capacitor CC (not shown). Alternatively, the communication dedicated line COL may be directly connected to the controller 16, without through the AC coupling capacitor CC.

Portions illustrated with the circular dashed-line illustrate that the cable used for the power line POL and the cable used for communication dedicated line COL are separated. A USB PD cable can be applied to the cable for the power line POL, and a communication dedicated cable (COM) can be applied to the cable for the communication dedicated line COL. Moreover, an internal cable for changing between the power line POL and the communication dedicated line COL may be used therefor.

The AC/DC converter 60 and the controller 16 are mounted in the monitor 110. A CPU+interface board 122, and the controller 16 are mounted in the external hard disk drive 120. A CPU+interface board 132 and the controller 16 are mounted in the set top box 130. A Narrow Voltage DC/DC (NVDC) charger 142, a CPU 148, a Platform Controller Hub (PCH) 147, an Embedded Controller (EC) 146, and the controller 16 are mounted in the laptop PC 140. An Application CPU (ACPU) 156, a battery charger IC (CHG) 158, a battery 157, and the controller 16 are mounted in the tablet PC 150. An Application CPU (ACPU) 166, a USB battery charger IC 162, a battery 172, and the controller 16 are mounted in a smartphone 160.

Figure 33:
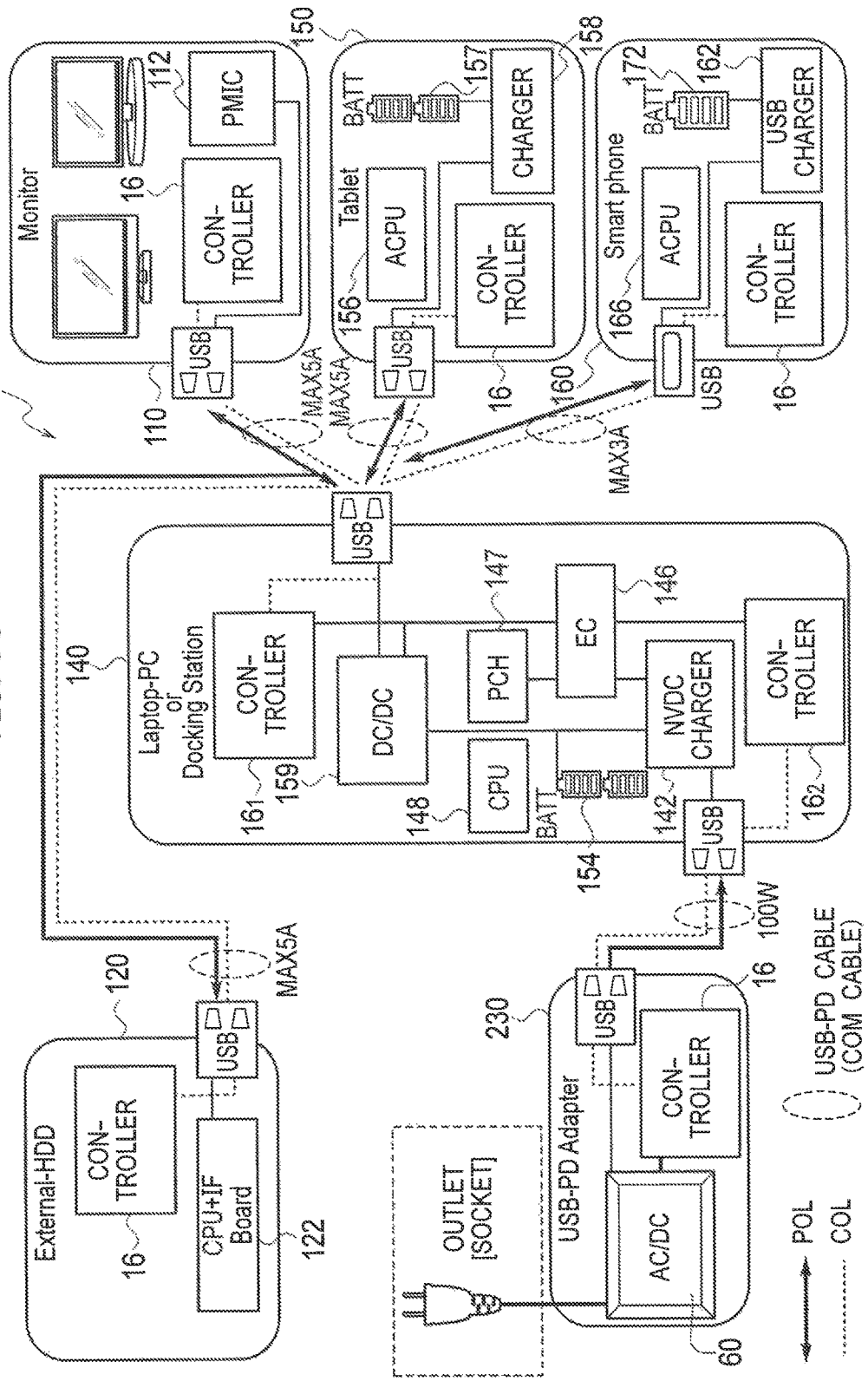
FIG. 33 is a schematic block configuration diagram showing a second PD system to which the PD device according to the embodiments can be applied.

As shown in FIG. 33, a second PD system 200 to which the PD device according to the embodiments can be globally applied includes: a USB PD adapter 230 connected to an outlet through a plug; a laptop PC 140 connected to the USB PD adapter 230; and an external hard disk drive 120, a monitor 110, a tablet PC 150, and a smartphone 160 connected to the laptop PC 140. In the present embodiments, otherwise, the laptop PC 140 may be a docking station.

Although the PD device 4 according to the embodiments is mounted in each configuring elements, illustration of the DC/DC converter is omitted, but the controller 16 is illustrated in FIG. 33. Moreover, the AC coupling capacitor CC may be applied to the communication dedicated line COL. Moreover, when applying the USB PD, a USB PD controller may be applied to the controller 16.

Power transmission and communications data transmission can be executed using the power line POL and the communication dedicated line COL, between the laptop PC 140, and the USB PD adapter 230, the external hard disk drive 120, the monitor 110, the tablet PC 150 and the smartphone 160.

The AC/DC converter 60 and the controller 16 are mounted in the USB PD adapter 230. An NVDC charger 142, a CPU 148, a PCH 147, a EC 146, a battery 154, a DC/DC converter 159, and controllers 161, 162 are mounted in the laptop PC 140. A PMIC 112 and a controller 16 are mounted in the monitor 110. Other configurations are the same as those of the first PD system 100 (FIG. 32).

Figure 34:
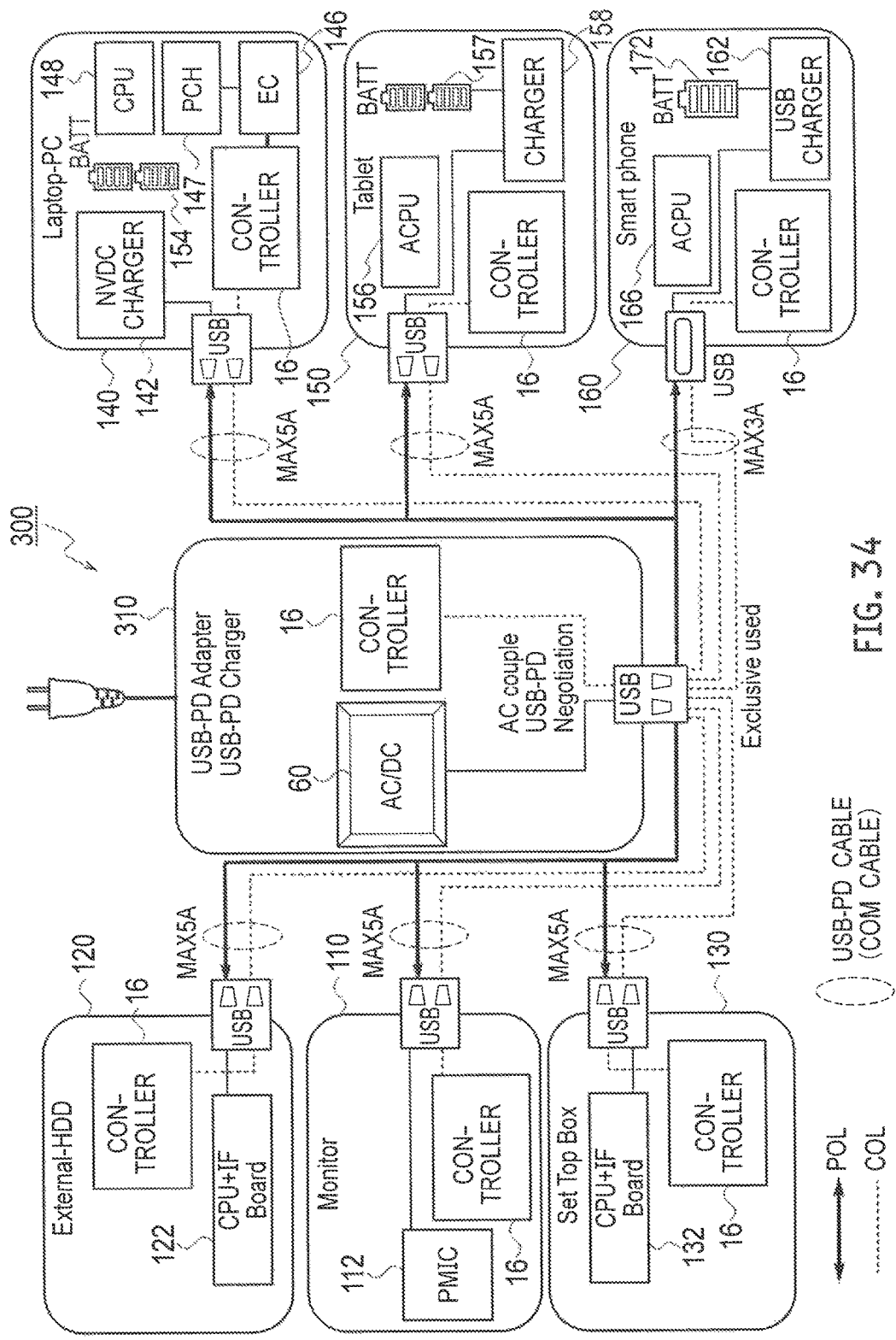
FIG. 34 is a schematic block configuration diagram showing a third PD system to which the PD device according to the embodiments can be applied.

As shown in FIG. 34, a third PD system 300 to which the PD device according to the embodiments can be globally applied includes: a USB PD adapter/charger 310 connected to an outlet through a plug; and an external hard disk drive 120, a monitor 110, a set top box 130, a laptop PC 140, a tablet PC 150, and a smart phone 160 each connected to the USB PD adapter/charger 310.

Although the PD device 4 according to the embodiments is mounted in each configuring elements, illustration of the DC/DC converter is omitted, but the controller 16 is illustrated in FIG. 34. Moreover, the AC coupling capacitor CC may be applied to the communication dedicated line COL. Moreover, when applying the USB PD, a USB PD controller may be applied to the controller 16.

Power transmission and communications data transmission can be executed using the power line POL and the communication dedicated line COL, between the USB PD adapter/charger 310, and the external hard disk drive 120, the monitor 110, the set top box 130, the laptop PC 140, the tablet PC 150 and the smartphone 160.

The AC/DC converter 60 and the controller 16 are mounted in the USB PD adapter/charger 310. Other configurations are the same as those of the first PD system 100 (FIG. 32) and the second PD system 200 (FIG. 33).

Figure 35:
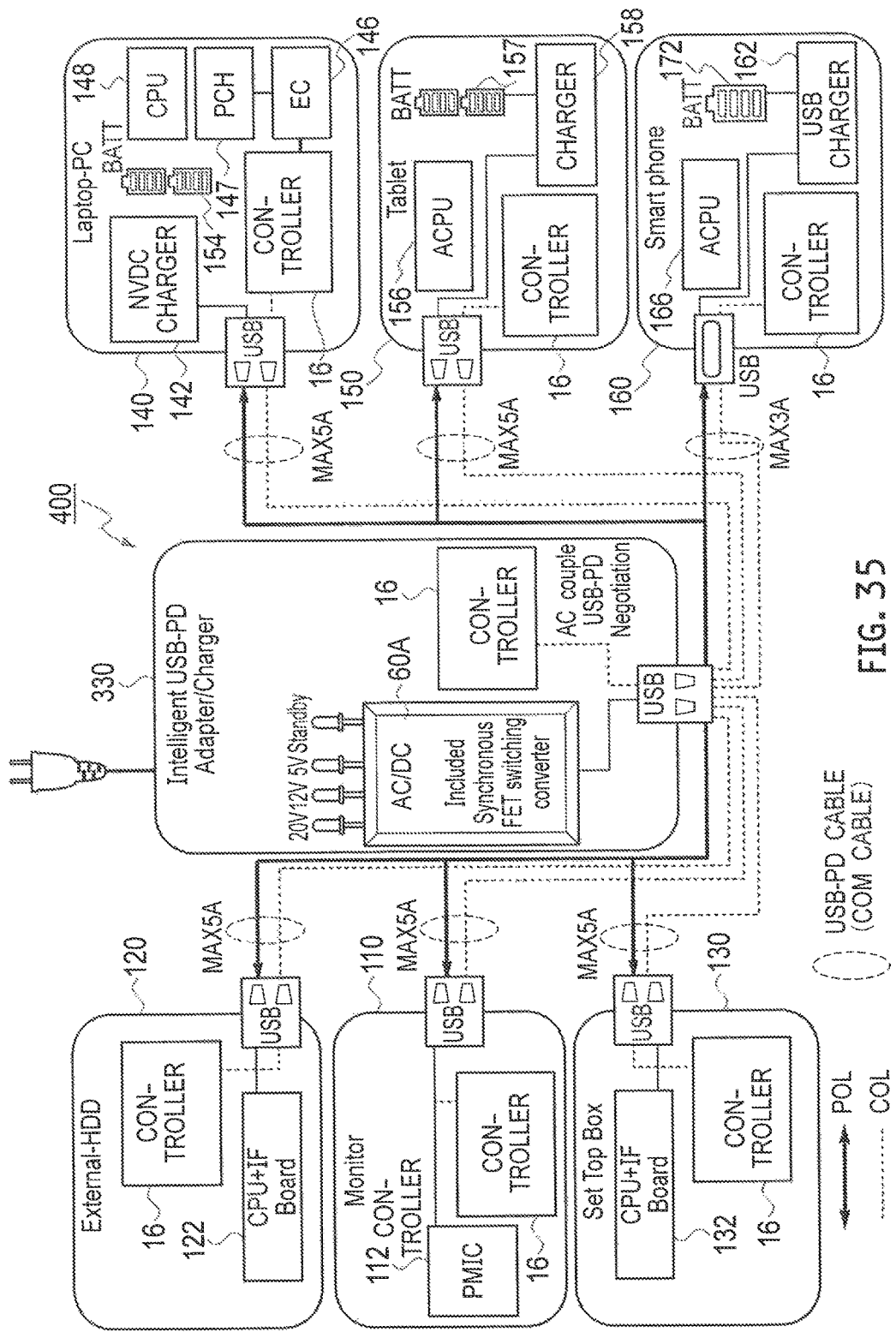
FIG. 35 is a schematic block configuration diagram showing a fourth PD system to which the PD device according to the embodiments can be applied.

As shown in FIG. 35, a fourth PD system 400 to which the PD device according to the embodiments can be globally applied includes: a high-performance USB PD adapter/charger 330 connected to an outlet through a plug; and an external hard disk drive 120, a monitor 110, a set top box 130, a laptop PC 140, a tablet PC 150, and a smart phone 160 each connected to the high-performance USB PD adapter/charger 330.

Although the PD device 4 according to the embodiments is mounted in each configuring elements, illustration of the DC/DC converter is omitted, but the controller 16 is illustrated in FIG. 35. Moreover, the AC coupling capacitor CC may be applied to the communication dedicated line COL. Moreover, when applying the USB PD, a USB PD controller may be applied to the controller 16.

Power transmission and communications data transmission can be executed using the power line POL and the communication dedicated line COL, between the high-performance USB PD adapter/charger 330, and the external hard disk drive 120, the monitor 110, the set top box 130, the laptop PC 140, the tablet PC 150 and the smartphone 160.

The AC/DC converter 60A including a synchronous FET switching converter, and the controller 16 are mounted in the high-performance USB PD adapter/charger 330. Other configurations are the same as that of the third PD system 300 (FIG. 34).

Figure 36:
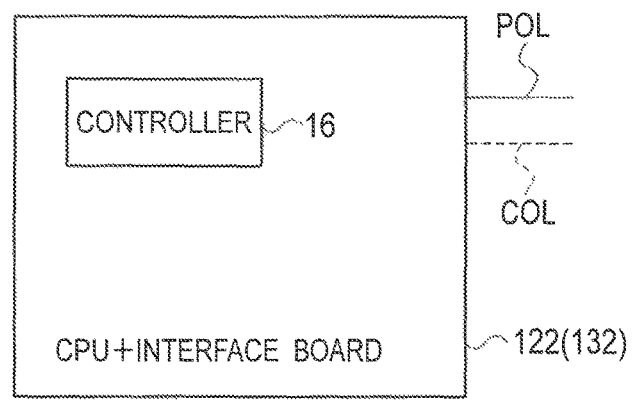
FIG. 36 is a schematic block configuration diagram showing a configuration in which a controller is contained in a CPU interface, in the PD system to which the PD device according to the embodiments can be applied.

FIG. 36 shows a schematic block configuration having a configuration in which the controller 16 is contained in a CPU interface 122 (132), in the PD system to which the PD device according to the embodiments can be applied. More specifically, in the PD systems 100 to 400 respectively shown in FIGS. 32 to 35, the controller 16 may be contained in a CPU+interface board 122 (132). In this case, the power line POL and the communication dedicated line COL are used for the CPU+interface board 122, and thereby electric power and communications data can be transmitted. A chip in which the controller 16 is contained in such a CPU+interface board 122 (132) can also be configured as an integrated chip with a CPU including a controller, a DSP, and another controller.

As explained above, according to the embodiments, there can be provided the PD device, the AC adapter, the AC charger, the electronic apparatus, and the PD system, each in which no filter coil is required for an output side and the mounting space is reduced, and thereby capable of achieving miniaturization and cost reduction, and capable of controlling the output voltage value and the available output current capacity (MAX value).

[Other Embodiments]

As explained above, the embodiments have been described, as a disclosure including associated description and drawings to be construed as illustrative, not restrictive. This disclosure makes clear a variety of alternative embodiment, working examples, and operational techniques for those skilled in the art.

Such being the case, the embodiments described herein cover a variety of embodiments, whether described or not.

INDUSTRIAL APPLICABILITY

The PD device, the AC adapter, the AC charger, the electronic apparatus, and the PD system according to the embodiments are applicable to electrical household appliances and electrical equipment, mobile computing devices, etc.

What is claimed is:
1. A power delivery device comprising:
a DC/DC converter disposed between an input and an output;
a primary-side controller configured to control an input current of the DC/DC converter; and
a secondary-side controller coupled to a control input terminal, the secondary-side controller configured to receive a control input signal to be supplied to the control input from an external apparatus to which electric power is delivered, and then feedback the received control input signal to the primary-side controller, wherein:
the control input terminal comprises a front-side terminal electrode and a back-side terminal electrode so as to be connectable from the external apparatus without distinction between front and back sides; and
the primary-side controller varies an output voltage value and an available output current capacity of the DC/DC converter by controlling the input current of the DC/DC converter on the basis of the control input signal fed back from the secondary-side controller.

2. The power delivery device according to claim 1, wherein
the secondary-side controller comprises a voltage and current control circuit configured to control the output voltage value, the available output current capacity and an output current of the DC/DC converter on the basis of the control input signal.

3. The power delivery device according to claim 1, wherein
the control input terminal is directly connected to the secondary-side controller.

4. The power delivery device according to claim 1, further comprising
an AC coupling capacitor coupled to the control input terminal; wherein
the secondary-side controller is connected to the control input terminal through the AC coupling capacitor.

5. The power delivery device according to claim 1, comprising
an insulation circuit connected to the secondary-side controller, the insulation circuit configured to feedback the control input signal to the primary-side controller.

6. The power delivery device according to claim 5, comprising
an error amplifier for error compensation connected to the secondary-side controller, the error amplifier configured to feedback the control input signal to the insulation circuit.

7. A power delivery device comprising:
a DC/DC converter disposed between an input and an output;
a primary-side controller configured to control an input current of the DC/DC converter; and
an insulation circuit connected to a control input terminal, the insulation circuit configured to feedback a control input signal to be supplied to the control input to the primary-side controller from an external apparatus to which electric power is delivered, wherein:
the control input terminal comprises a front-side terminal electrode and a back-side terminal electrode so as to be connectable from the external apparatus without distinction between front and back sides; and
the primary-side controller varies an output voltage value and an available output current capacity of the DC/DC converter by controlling the input current of the DC/DC converter on the basis of the control input signal fed back from the insulation circuit.

8. The power delivery device according to claim 7, wherein
the control input terminal is directly connected to the insulation circuit.

9. The power delivery device according to claim 7, further comprising
an AC coupling capacitor coupled to the control input terminal; wherein
the insulation circuit is connected to the control input terminal through the AC coupling capacitor.

10. The power delivery device according to claim 9, wherein
the AC coupling capacitor is contained in the insulation circuit.

11. The power delivery device according to claim 10, further comprising
a switch connected to an output of the DC/DC converter, the switch configured to interrupt the output voltage of the DC/DC converter.

12. The power delivery device according to claim 11, wherein
the switch comprises an insulated gate field effect transistor.

13. The power delivery device according to claim 12, further comprising
a power source supply circuit connected between the input and the primary-side controller, the power source supply circuit configured to supply a power source to the primary-side controller.

14. The power delivery device according to claim 13, further comprising
an AC/DC converter connected between an AC input and an input of the DC/DC converter.

15. The power delivery device according to claim 14, wherein
the DC/DC converter comprises a diode rectification.

16. A power delivery device comprising:
a DC/DC converter disposed between an input and an output;
a primary-side controller configured to control an input current of the DC/DC converter;
an insulation circuit connected to a control input, the insulation circuit configured to feed back a control input signal of the control input to the primary-side controller;
an AC coupling capacitor coupled to the control input;
a switch connected to an output of the DC/DC converter, the switch configured to interrupt the output voltage of the DC/DC converter;
a power source supply circuit connected between the input and the primary-side controller, the power source supply circuit configured to supply a power source to the primary-side controller; and
an AC/DC converter connected between an AC input and an input of the DC/DC converter, wherein
the primary-side controller varies an output voltage value and an available output current capacity of the DC/DC converter by controlling the input current on the basis of the control input signal fed back from the insulation circuit, wherein
the insulation circuit is connected to the control input through the AC coupling capacitor, and the AC coupling capacitor is contained in the insulation circuit, wherein
the switch comprises an insulated gate field effect transistor, and the DC/DC converter comprises a diode rectification, wherein
the DC/DC converter comprises:
a transformer;
a first MOS transistor and a current sensing resistor connected in series between a primary-side inductance of the transformer, and a ground potential;
a diode connected between a secondary-side inductance of the transformer, and the output; and
a first capacitor connected between the output and the ground potential.

17. An AC adapter comprising the power delivery device according to claim 1.

18. An AC charger comprising the power delivery device according to claim 1.

19. An electronic apparatus comprising the power delivery device according to claim 1.

20. A power delivery system comprising a power delivery device, the power delivery device comprising:
a DC/DC converter disposed between an input and an output;

a primary-side controller configured to control an input current of the DC/DC converter; and a secondary-side controller coupled to a control input terminal, the secondary-side controller configured to receive a control input signal to be supplied to the control input from an external apparatus to which electric power is delivered, and then feedback the received control input signal to the primary-side controller, wherein:

the control input terminal comprises a front-side terminal electrode and a back-side terminal electrode so as to be connectable from the external apparatus without distinction between front and back sides; and the primary-side controller varies an output voltage value and an available output current capacity of the DC/DC converter by controlling the input current of the DC/DC converter on the basis of the control input signal fed back from the secondary-side controller.

* * * * *